(12) United States Patent
Root et al.

(10) Patent No.: US 10,814,814 B2
(45) Date of Patent: Oct. 27, 2020

(54) SENSOR SYSTEM FOR VEHICLE CLOSURE

(71) Applicant: Huf North America Automotive Parts Manufacturing Corp., Milwaukee, WI (US)

(72) Inventors: Jeffery T. Root, Howell, MI (US); Lynn D. Da Deppo, Bloomfield Hills, MI (US); David Newkirk, West Bloomfield, MI (US); Doug Carson, West Bloomfield, MI (US); Ehab Kamal, Novi, MI (US); Darek Barczynski, Ann Arbor, MI (US); Trent Newkirk, Holly, MI (US)

(73) Assignee: Huf North America Automotive Paris Manufacturing Corp., Milwaukee, WI (US)

( * ) Notice: Subject to any disclaimer, the term of this patent is extended or adjusted under 35 U.S.C. 154(b) by 0 days.

(21) Appl. No.: 16/710,436

(22) Filed: Dec. 11, 2019

(65) Prior Publication Data
US 2020/0114854 A1  Apr. 16, 2020

Related U.S. Application Data

(62) Division of application No. 15/927,728, filed on Mar. 21, 2018, now Pat. No. 10,538,215.
(Continued)

(51) Int. Cl.
*B60R 21/0134* (2006.01)
*B60R 11/04* (2006.01)
(Continued)

(52) U.S. Cl.
CPC .......... *B60R 21/0134* (2013.01); *B60R 11/04* (2013.01); *B60R 2011/004* (2013.01); *B60R 2011/0085* (2013.01); *E05F 15/42* (2015.01); *E05Y 2400/852* (2013.01); *E05Y 2600/10* (2013.01); *E05Y 2900/50* (2013.01); *E05Y 2900/544* (2013.01)

(58) Field of Classification Search
CPC ............ B60R 11/04; B60R 2011/0085; E05Y 2400/852; E05Y 2600/10; E05Y 2900/50; E05Y 2900/544
See application file for complete search history.

(56) References Cited

U.S. PATENT DOCUMENTS

| 9,669,771 | B1 | 6/2017 | Helm |
| 2013/0038081 | A1 | 2/2013 | Kerr, III |
| 2019/0359146 | A1* | 11/2019 | Da Deppo .............. B60R 11/04 |

OTHER PUBLICATIONS

United States Patent and Trademark Office, Office Action for U.S. Appl. No. 15/927,728, dated Jun. 7, 2019.

* cited by examiner

*Primary Examiner* — Thomas S McCormack
(74) *Attorney, Agent, or Firm* — Honigman LLP; Matthew H. Szalach; Jonathan P. O'Brien

(57) ABSTRACT

An assembly for a vehicle having a closure panel is disclosed. The assembly includes a sensor, a housing supporting the sensor within the closure panel between a first deployed position and a second deployed position, a link rotatably attached to the housing and a plunger coupled to the link. The sensor is operable to sense an area proximate to the closure panel in the first deployed position and in the second deployed position. The plunger is operable to selectively engage a surface of the vehicle to move the housing between the first deployed position and the second deployed position via the link.

16 Claims, 19 Drawing Sheets

Related U.S. Application Data

(60) Provisional application No. 62/475,071, filed on Mar. 22, 2017.

(51) Int. Cl.
*E05F 15/42* (2015.01)
*B60R 11/00* (2006.01)

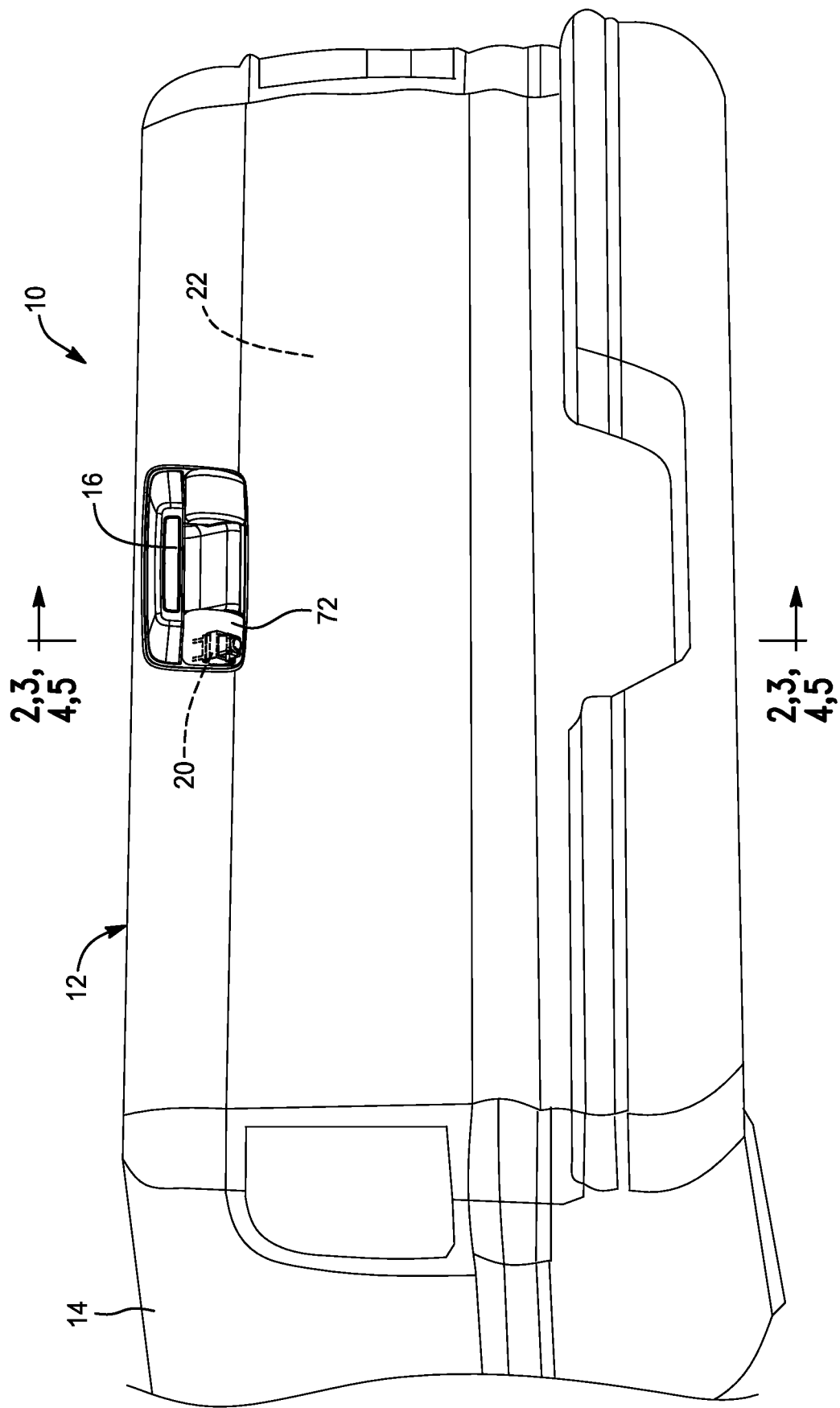

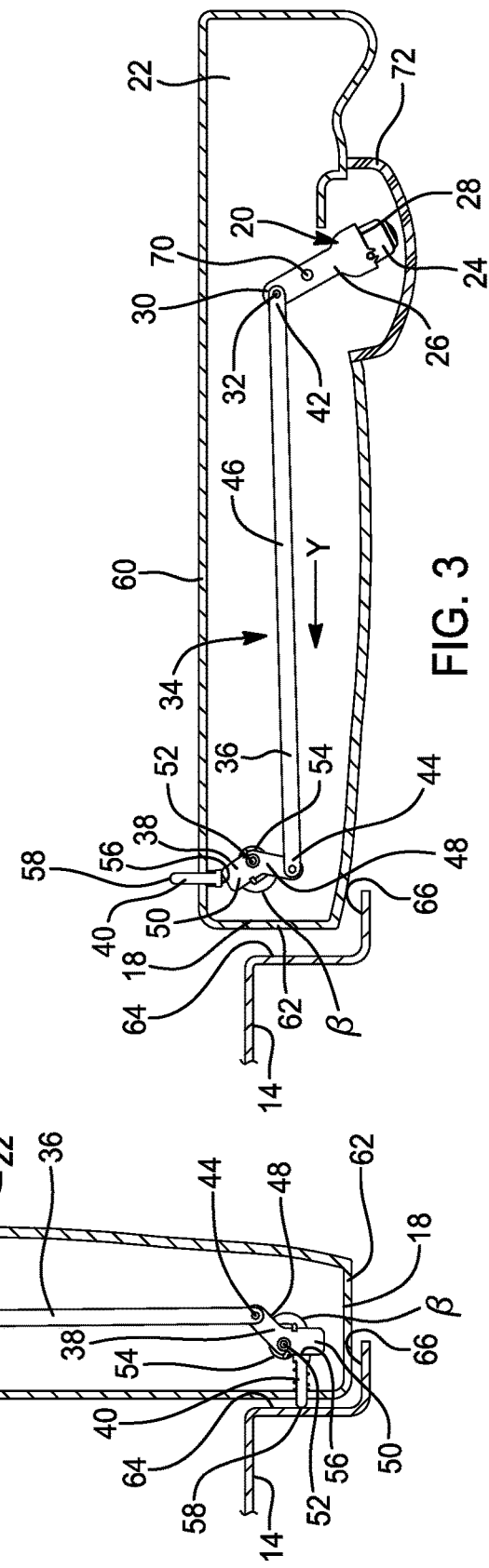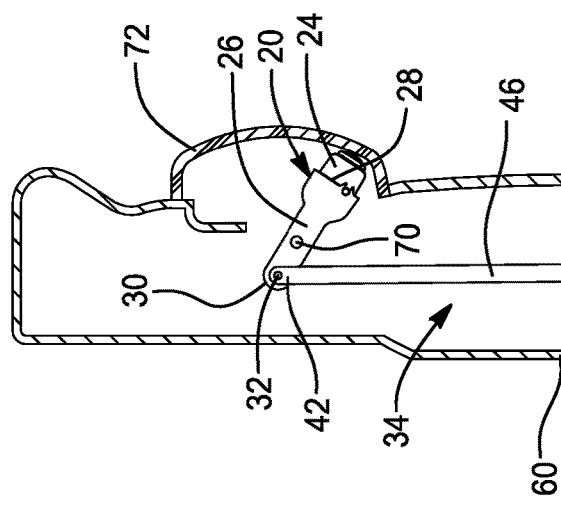

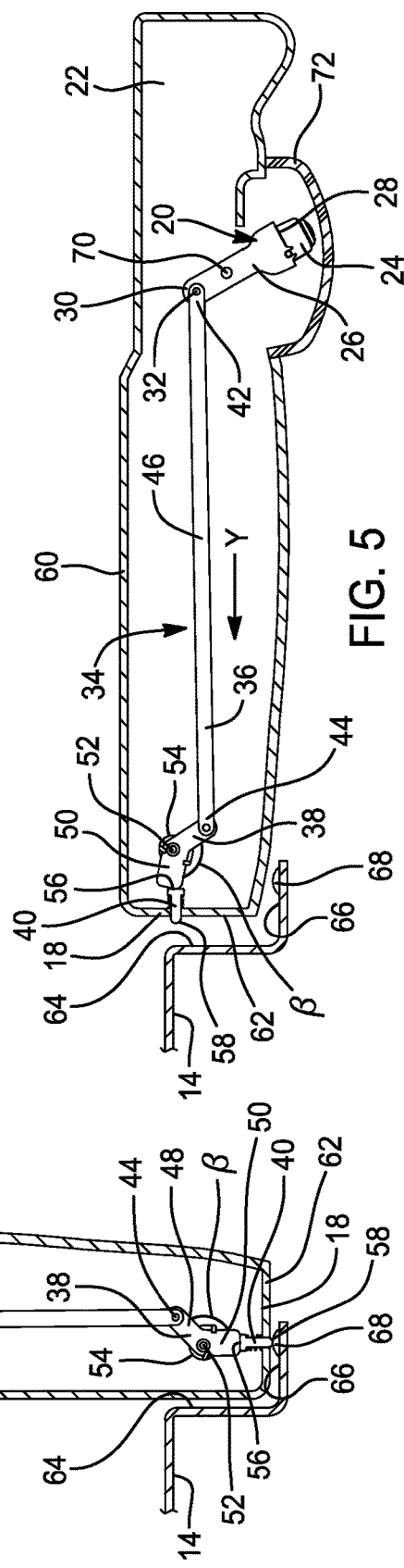
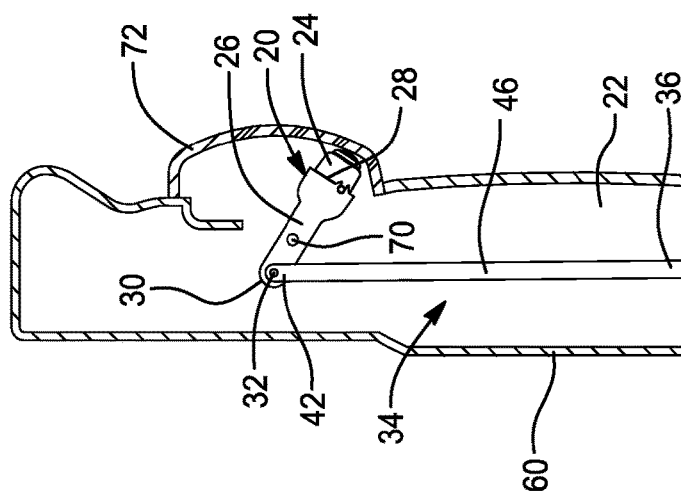
FIG. 5
FIG. 4

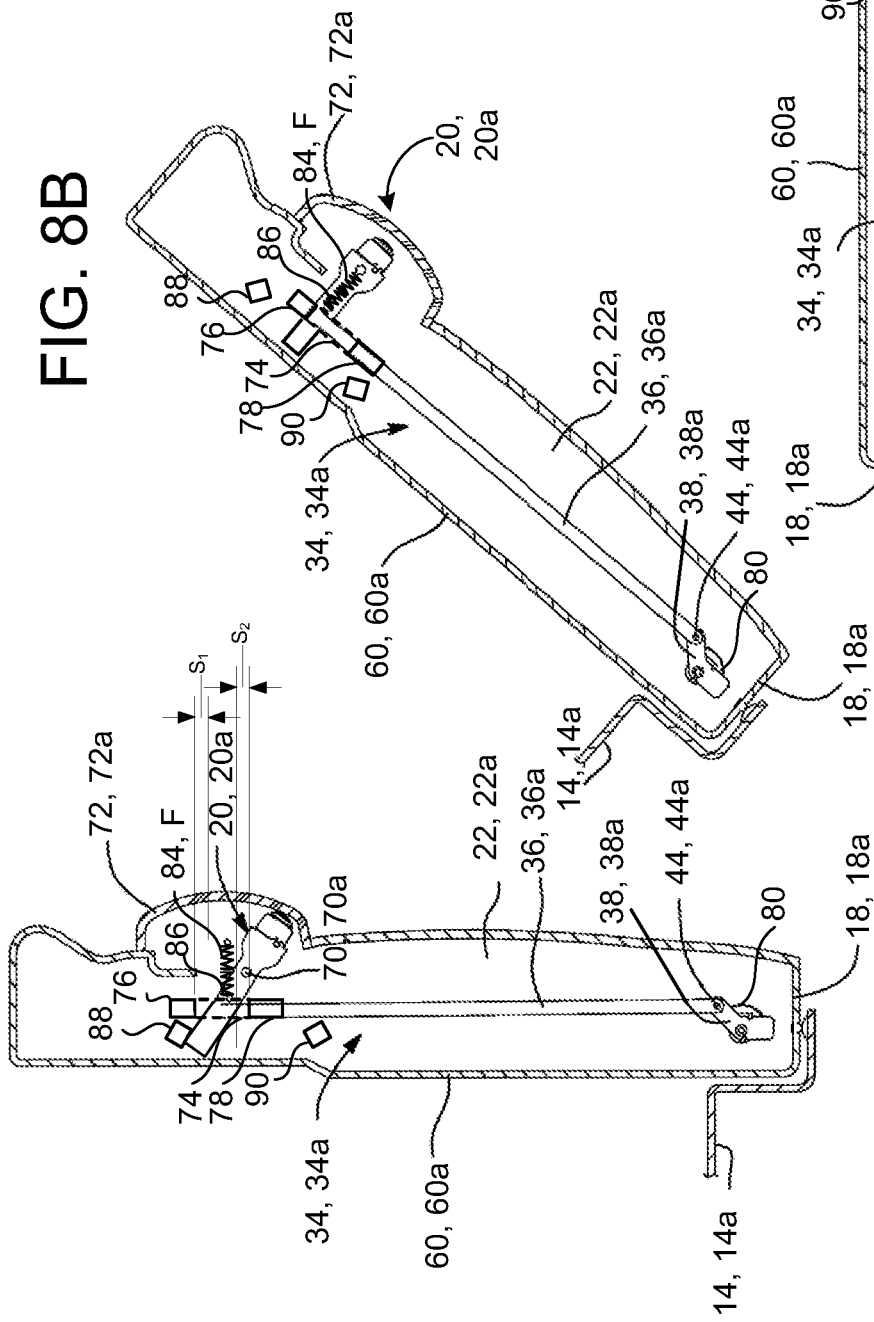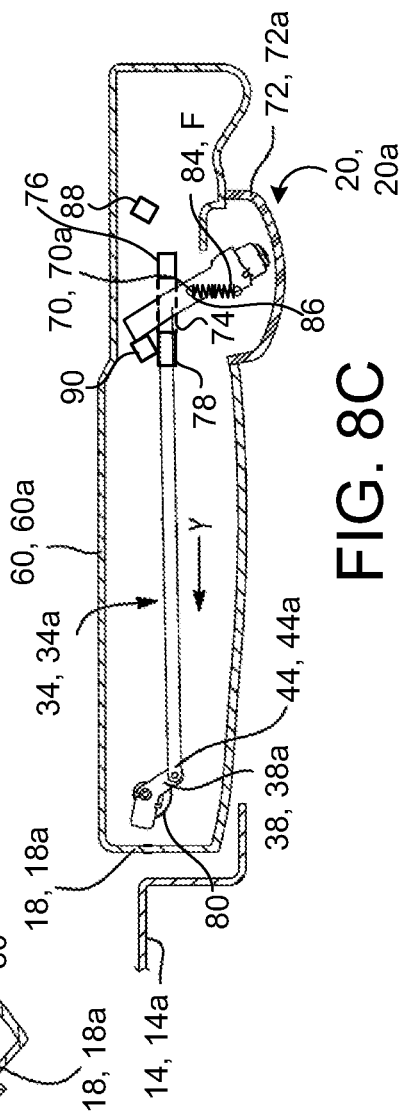

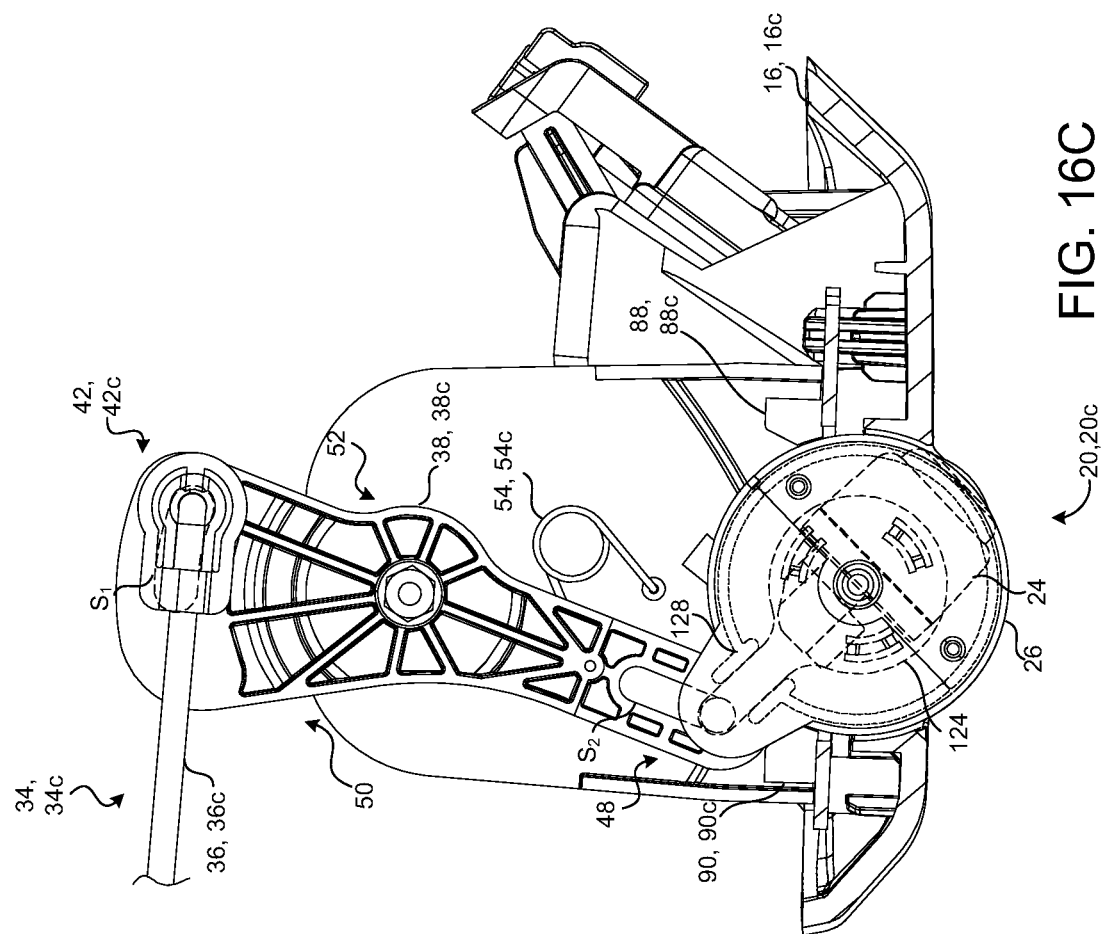

SENSOR SYSTEM FOR VEHICLE CLOSURE

CROSS REFERENCE TO RELATED APPLICATION

This application is a division of, and claims priority under 35 U.S.C. § 121 from, U.S. patent application Ser. No. 15/927,728, filed on Mar. 21, 2018, which claims priority under 35 U.S. § 119(e) to U.S. Provisional Application 62/475,071, filed on Mar. 22, 2017, the disclosures of which are hereby incorporated by reference in their entireties.

FIELD

The present disclosure relates generally to a sensor assembly for a vehicle and more particularly to a deployable sensor assembly for a vehicle closure.

BACKGROUND

This section provides background information related to the present disclosure which is not necessarily prior art.

Many motor vehicles now come equipped with some variation of a camera or sensor system to provide real-time monitoring or viewing of an area near the motor vehicle. For example, cameras, sensors, or both are often positioned on the front of the vehicle or on the rear of the motor vehicle. The cameras and sensors can detect the areas surrounding the vehicle that may or may not be otherwise viewable with conventional mirrors. Such cameras and sensors can be used to assist the vehicle operator in parking or maneuvering the vehicle during normal operation, for example.

To provide a consistent field of view, many camera and sensor systems do not include a cover and are fixedly directed at the space they are intended to monitor. Uncovered cameras and sensors are prone to damage from environmental conditions and exposure, including damage from dirt and stone chipping, and also from human intervention, including theft. To better protect the camera, sensor, or other device, some vehicles utilize a deployable system in which an electric motor, for example, drives the camera between an open or "deployed" position and a closed or "stowed" position.

While conventional deployable systems position a camera or sensor between a deployed position and a stowed position, such systems are not usable in conjunction with a movable closure panel such as a tailgate or liftgate in more than one deployed position. For example, while conventional deployable systems position a camera or sensor in a deployed position for use when the closure panel is in a closed position, use of the camera or sensor to monitor areas surrounding the vehicle when the closure panel is in an open position (i.e., a tailgate of a truck is lowered or a liftgate of a sport utility vehicle (SUV) is in a raised position) is not possible due to the position of the tailgate or liftgate relative to the vehicle.

For example, when the camera or sensor is in the deployed position, the camera or sensor is typically positioned at an angle to view an area behind the vehicle. When the liftgate is moved into the raised position or the tailgate is moved into the lowered position, the camera or sensor remains in the same deployed position relative to the liftgate or tailgate. As such, the camera or sensor views an area above the vehicle in the case of a liftgate or the ground under the tailgate due to the change in position of the liftgate or tailgate relative to the vehicle. Maintaining the relative position of the camera or sensor and the liftgate or tailgate renders the camera or sensor ineffective in viewing an area behind the vehicle should the vehicle be operated with the liftgate in the raised position or the tailgate in the lowered position.

SUMMARY

This section provides a general summary of the disclosure, and is not a comprehensive disclosure of its full scope or all of its features.

One aspect of the disclosure provides an assembly for a vehicle having a closure panel. The assembly includes a sensor, a housing supporting the sensor within the closure panel between a first deployed position and a second deployed position, a link rotatably attached to the housing, and a plunger coupled to the link. The sensor is operable to sense an area proximate to the closure panel in the first deployed position and in the second deployed position. The plunger is operable to selectively engage a surface of the vehicle to move the housing between the first deployed position and the second deployed position via the link.

Implementations of the disclosure may include one or more of the following optional features. In some implementations, the plunger moves the housing between the first deployed position and the second deployed position based on a position of the closure panel relative to the vehicle. The closure panel may be movable relative to the vehicle between a closed position and an open position. The plunger may be operable to move the housing into one of the first deployed position and the second deployed position when the closure panel is in one of the closed position and the open position and operable to move the housing into the other of the first deployed position and the second deployed position when the closure panel is in the other of the closed position and the open position. The sensor may be operable to sense approximately the same field-of-view in the area proximate to the closure panel when the sensor is in the first deployed position and when the sensor is in the second deployed position. In some examples, the closure panel is rotated approximately ninety degrees (90°) relative to the vehicle when rotated between the closed position and the open position. The sensor may be rotated approximately ninety degrees (90°) relative to the closure panel when the sensor is rotated between the first deployed position and the second deployed position.

In some implementations, the link is one of a rod and a cable. The link may be biased in a direction away from the sensor. The assembly may include a biasing member operable to exert a force on the link to bias the link in the direction away from the sensor. The assembly may also include an element disposed between and connecting the plunger and the link. The element may be a bell crank having a first arm in engagement with the plunger and a second arm in engagement with the link. The bell crank may be rotatably supported within the closure panel. The assembly may also include a biasing member operable to bias the bell crank in a first rotational direction.

In some examples, the sensor is one of a proximity sensor and a camera. The sensor may be at approximately the same angle relative to the vehicle when the sensor is in the first deployed position and when the sensor is in the second deployed position. The sensor may be at approximately the same angle relative to the vehicle when the closure panel is in the closed position and when the closure panel is in the open position.

Another aspect of the disclosure provides an assembly for a vehicle having a closure panel. The assembly includes a sensor, a housing supporting the sensor within the closure panel between a first deployed position and a second deployed position, and an actuation assembly. The sensor is operable to sense an area proximate to the closure panel in the first deployed position and in the second deployed position. The actuation assembly may be operable to engage a surface of the vehicle to move the housing between the first deployed position and the second deployed position.

This aspect may include one or more of the following optional features. In some implementations, the actuation assembly moves the housing between the first deployed position and the second deployed position based on a position of the closure panel relative to the vehicle. The closure panel may be movable relative to the vehicle between a closed position and an open position. The actuation assembly may be operable to move the housing into one of the first deployed position and the second deployed position when the closure panel is in one of the closed position and the open position and operable to move the housing into the other of the first deployed position and the second deployed position when the closure panel is in the other of the closed position and the open position.

In some examples, the sensor is operable to sense approximately the same field-of-view in the area proximate to the closure panel when the sensor is in the first deployed position and when the sensor is in the second deployed position. The closure panel may be rotated approximately ninety degrees (90°) relative to the vehicle when rotated between the closed position and the open position. The sensor may be rotated approximately ninety degrees (90°) relative to the closure panel when the sensor is rotated between the first deployed position and the second deployed position. The sensor may be one of a proximity sensor and a camera. The sensor may be at approximately the same angle relative to the vehicle when the sensor is in the first deployed position and when the sensor is in the second deployed position. The sensor may also be at approximately the same angle relative to the vehicle when the closure panel is in the closed position and when the closure panel is in the open position.

Another aspect of the disclosure provides a sensor system for vehicle closure. The system includes a sensor, an energy transfer mechanism coupled to the sensor and having a first end and a second end, and an energy storage device in communication with the second end of the energy transfer mechanism. Here, the energy transfer mechanism is configured to move the sensor between a first position and a second position as the first end of the energy transfer mechanism moves relative to the second end. The first position and the second position have equivalent field of views for the sensor. The energy storage device is further configured to provide energy for the energy transfer mechanism as the first end of the energy transfer mechanism moves relative to the second end of the energy transfer mechanism. In some examples, the energy storage mechanism is a torsion spring associated with a vehicle gate. Additionally or alternatively, the energy transfer mechanism includes a connecting rod and a bell crank. The connecting rod may be coupled to the torsion spring and the bell crank may be coupled to the sensor and the connecting rod.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

FIG. 1 is a partial rear perspective view of a vehicle including a tailgate having a sensor assembly in accordance with the principals of the present disclosure;

FIG. 2 is cross-sectional view taken along Line 2-2 of FIG. 1 showing the tailgate in an UP position and showing the sensor assembly in a first deployed position;

FIG. 3 is a cross-sectional view of the tailgate of FIG. 1 taken along Line 3-3 showing the tailgate in a DOWN position and the sensor assembly in a second deployed position;

FIG. 4 is a cross-sectional view of the tailgate of FIG. 1 taken along Line 4-4 and showing a sensor assembly in accordance with principals of the present disclosure in a first deployed position;

FIG. 5 is a cross-sectional view of the tailgate of FIG. 1 taken along Line 5-5 showing the tailgate in a DOWN position and the sensor assembly of FIG. 4 in a second deployed position;

FIG. 8A is cross-sectional view taken along Line 8-8 of FIG. 7 of the tailgate in an UP position and showing the sensor assembly in a first deployed position;

FIG. 8B is a cross-sectional view of the tailgate taken along Line 8-8 of FIG. 7 showing the tailgate halfway between the UP position and a DOWN position;

FIG. 8C is a cross-sectional view taken along Line 8-8 of FIG. 7 of the tailgate in the DOWN position with the sensor assembly in a second deployed position;

FIG. 16C is a cross-sectional view taken along Line 16-16 of FIG. 14 of the tailgate in the DOWN position with the sensor assembly in a second deployed position.

Corresponding reference numerals indicate corresponding parts throughout the drawings.

DETAILED DESCRIPTION

Figure 6:
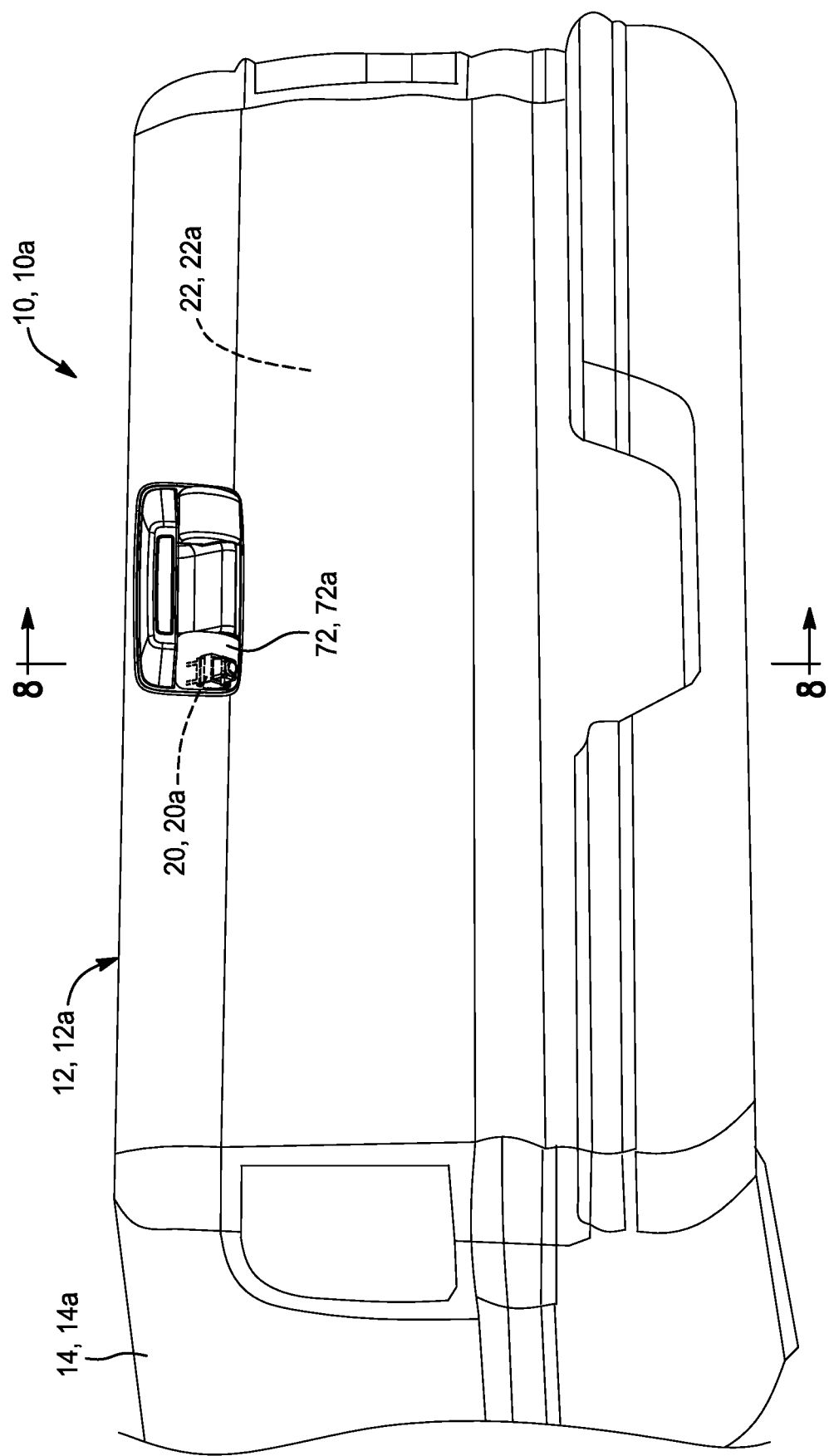
FIG. 6 is a partial rear perspective view of a vehicle including a tailgate having a sensor assembly in accordance with the principals of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

With reference to the figures, a vehicle 10 including a tailgate 12 is provided. The tailgate 12 maybe moveable relative to a body 14 of the vehicle 10 between an UP or closed position (FIG. 1) and a DOWN or open position (FIGS. 3 and 5). When the tailgate 12 is in the UP position, the tailgate 12 may be secured to the body 14 via a latch mechanism (not shown).

The tailgate 12 may be moved from the UP position to the DOWN position by moving an actuation handle 16 relative to the tailgate 12. Movement of the actuation handle 16 relative to the tailgate 12 causes the latch mechanism to move from a latched state to an unlatched state, thereby permitting movement of the tailgate 12 from the UP position to the DOWN position.

Movement of the tailgate 12 from the UP position to the DOWN position causes the tailgate 12 to rotate about a lower end 18 of the tailgate 12. Such rotation of the tailgate 12 about the lower end 18 relative to the body 14 causes the tailgate 12 to move from a generally upright state (FIGS. 2 and 4) to a generally horizontal state (FIGS. 3 and 5). In so doing, the tailgate 12 rotates substantially 90 degrees (90°) relative to the body 14.

A sensor assembly 20 may be disposed within a cavity 22 of the tailgate 12 and may be moveable between a first deployed position (FIGS. 2, 4, 8A, 11, 13A, 13B, 16A) and a second deployed position (FIGS. 3, 5, 8C, 13C, 13D, 16C). As will described in greater detail below, movement the sensor assembly 20 between the first deployed position and the second deployed position is based on a position of the tailgate 12 relative to the vehicle 10. While the sensor assembly 20 is shown and described as being used in conjunction with a tailgate 12, the sensor assembly 20 could be used with a different closure panel of a vehicle such as, for example, a liftgate of a sport utility vehicle (SUV).

The sensor assembly 20 may include a sensor 24 and a sensor housing 26. The sensor 24 may be any sensor that is capable of monitoring conditions in an area surrounding the vehicle 10. For example, the sensor 24 may be a camera and/or a proximity sensor. The sensor 24 may be received and supported by the sensor housing 26 relative to the tailgate 12 at a first end 28 of the sensor housing 26. A second end 30 of the sensor housing 26 may be disposed on an opposite end of the sensor housing 26 then the first end 28 and may include an attachment aperture 32. The attachment aperture 32 may be rotatably coupled to an actuation mechanism 34 that moves the sensor housing 26 and, thus, the sensor 24, relative to the tailgate 12 between the first deployed position and the second deployed position.

The actuation mechanism 34 is disposed within the cavity 22 of the tailgate 12 and includes a link 36, a bell crank 38, and a plunger 40. The link 36 includes a first end 42 rotatably attached to the second end 30 of the sensor housing 26, a second end 44 rotatably attached to the bell crank 38, and a main body 46 extending between the first end 42 and the second end 44. As shown in the drawings, the main body 46 may be an elongate rod and may be formed from a metal material such as, for example, steel. While the main body 46 is described and shown as being an elongate rod, the main body 46 could alternatively be formed from a length of cable extending between the sensor housing 26 and the bell crank 38.

The bell crank 38 is rotatably attached to the second end 44 of the link 36 and includes a first leg 48 and a second leg 50. The first leg 48 is rotatably attached to the second end 44 of the link 36 and the second leg 50 extends from the first leg 48 for interaction with the plunger 40, as will be described in greater detail below. As shown in FIGS. 2-5, the second leg 50 extends from the first leg 48 at an angle (($\beta$). Positioning the first leg 48 at an angle (($\beta$) relative to the second leg 50 allows the bell crank 38 to change the direction of a force applied at the second leg 50 which, in turn, allows the bell crank 38 to cause the link 36 to translate relative to the tailgate 12 within the cavity 22 during operation of the actuation mechanisms 34.

As shown in FIGS. 2-5, the first leg 48 and the second leg 50 rotate about a common fulcrum 52 at a junction of the first leg 48 and the second leg 50. Accordingly, when the bell crank 38 is rotated relative to and within the tailgate 12, the first leg 48 and the second leg 50 rotate about the fulcrum 52. A biasing member 54 maybe located at the fulcrum 52 to apply a biasing force on the bell crank 38. In one configuration, the biasing member 54 is a coil spring that biases the bell crank 38 in the clockwise direction (CW) relative to the views shown in FIGS. 2 and 4. Accordingly, the bell crank 38 biases the link 36 in a direction (Y), as shown in FIGS. 3 and 5.

The plunger 40 includes an engagement surface 56 and a contact surface 58 disposed on an opposite end the plunger 40 than the engagement surface 56. As shown in FIGS. 2-5, the engagement surface 56 is in contact with the second leg 50 of the bell crank 38 while the contact surface 58 is in selective engagement with the body 14 of the vehicle 10.

In one configuration, the plunger 40 extends from a rear panel 60 of the tailgate 12. As such, the contact surface 58 is exposed at the rear panel 60 of the tailgate 12 when the tailgate 12 is in the DOWN position. In another configuration, the plunger 40 extends from a bottom surface 62 of the tailgate 12 when the tailgate 12 is in the DOWN position. As shown in FIGS. 2-5, the rear panel 60 is at a substantially ninety degree angle (90°) relative to the bottom surface 62.

With particular reference to FIGS. 2-5, operation of the sensor assembly 20 and actuation mechanism 34 will be described in detail. When the tailgate 12 is in the UP position (FIGS. 2 and 4), the plunger 40 extends from the rear panel 60 (FIG. 2) or from the bottom surface (62) of the tailgate 12 depending on the particular configuration of the actuation mechanism 34. If the actuation mechanism 34 is configured such that the plunger 40 extends from the tailgate 12 at the rear panel 60, the contact surface 58 engages a first surface 64 of the body 14 when the tailgate is in the UP position. Similarly, if the actuation mechanism 34 is configured such that the plunger 40 extends from the tailgate 12 at the bottom surface 62, the contact surface 58 of the plunger 40 engages a second surface 66 of the body 14. Specifically, the contact surface 58 may engage a ramp or cam surface 68 associated with the second surface 66.

Engagement between the contact surface 58 of the plunger 40 and one of the first surface 64 and the second surface 66 of the body 14 causes the plunger 40 to move into the cavity 22, thereby causing the engagement surface 56 of the plunger 40 to exert force on the second leg 50 of the bell crank 38. The force exerted on the second leg 50 by the plunger 40 causes the bell crank 38 to rotate in the counterclockwise (CCW) direction relative to the views shown in FIGS. 2-5. Rotation of the bell crank 38 in the counterclockwise (CCW) direction causes the first leg 48 of the bell crank 38 to move in a direction toward the bottom surface 62 of the tailgate 12. In so doing, a force is applied on the link 36 due to the rotatable attachment of the leg 48 of the bell crank 38 and the second end 44 of the link 36. The applied force causes the link 36 to move in a direction (Y) and toward the bottom surface 62 of the tailgate 12.

Movement of the link 36 in direction (Y) and toward the bottom surface 62 of the tailgate 12 applies a rotational force on the sensor housing 26 at the second end 30 of the sensor housing 26. Namely, because the sensor housing 26 is rotatably attached relative to the tailgate 12 at a pivot 70, the force applied on the sensor housing 26 via the link 36 causes the sensor housing 26 to rotate about the pivot 70 and in the counterclockwise direction (CCW) relative to the views shown in FIGS. 2-5.

As shown in FIGS. 2-5, rotation of the sensor housing 26 and, thus, the sensor 24 in the counterclockwise direction (CCW), causes the sensor 24 to be moved relative to the tailgate 12. As such, the sensor 24 is permitted to maintain a desired field-of-view when the tailgate 12 is moved from the UP position to the DOWN position. For example, when the tailgate 12 is in the UP position, the sensor housing 26 and, thus, the sensor 24 are positioned relative to a cover 72 associated with the tailgate 12 such the sensor 24 is permitted to sense an area generally behind the vehicle 10. In this position, the sensor 24 is located proximate to a bottom of the cover 72, as shown in FIG. 2. When the tailgate 12 is moved from the UP position to the DOWN position, the sensor housing 26 and, thus, the sensor 24 are rotated away from the bottom of the cover 72 and toward a top portion of the cover 72, as shown in FIG. 3, to permit the sensor 24 to maintain a view of an area behind the vehicle 10 even though the tailgate 12 is in the DOWN position.

Movement of the sensor housing 26 and the sensor 24 toward the top of the cover 72 happens automatically when the tailgate 12 is sufficiently rotated relative to the body 14 and toward the DOWN position. Namely, when the tailgate 12 is rotated a predetermined distance from the UP position toward the DOWN position, the plunger 40 may disengage the body 14 at one of surfaces 64, 66 depending on the particular configuration of the actuation mechanism 34. Once the plunger 40 extends relative to the body 14, the biasing member 54 is permitted to exert a force on and rotate the bell crank 38 relative to the tailgate 12. In so doing, the plunger 40 extends from the tailgate 12, as shown in FIGS. 3 and 5, and the sensor housing 26 and the sensor 24 are rotated via the link 36 in a direction toward the top portion of the cover 72.

When the tailgate is returned to the UP position from the DOWN position, the contact surface 58 of the plunger 40 contacts one of the first surface 64 and the second surface 66 of the body 14 depending on the particular configuration of the actuation mechanism 34. Engagement between the contact surface 58 and one of the first surface 64 and the second surface 66 causes the plunger 40 to impart a rotational force on the bell crank 38 against the biasing member 54, thereby causing the plunger 40 to move into the cavity 22. Movement of plunger 40 into the cavity 22 causes the bell crank 38 to rotate in the counterclockwise direction (CCW) relative to the view shown in FIGS. 2-5, thereby causing the link 36 to move in a direction opposite to direction (Y). Movement of the link (36) in the direction opposite direction (Y) causes the sensor housing 26 and, thus, the sensor 24, to rotate in the clockwise direction (CW) and toward the bottom portion of the cover 72, as shown in FIGS. 2 and 4. Sufficient rotation of the sensor 24 in the clockwise direction (CW) allows the sensor 24 to sense an area behind the vehicle (10) when the tailgate 12 is returned to the UP position.

With reference to FIGS. 6-9, another sensor assembly 20, 20*a* is shown. The structure and function of the sensor assembly 20, 20*a* may be substantially similar to that of the sensor assembly 20 apart from any exceptions described below and/or shown in the Figures. Accordingly, the structure and/or the function of similar features will not be described again in detail. In addition, like reference numerals are used hereinafter and in the drawings to identify like features, while like reference numerals containing letter extensions (e.g., "a") are used to identify those features that have been modified.

Figure 7:
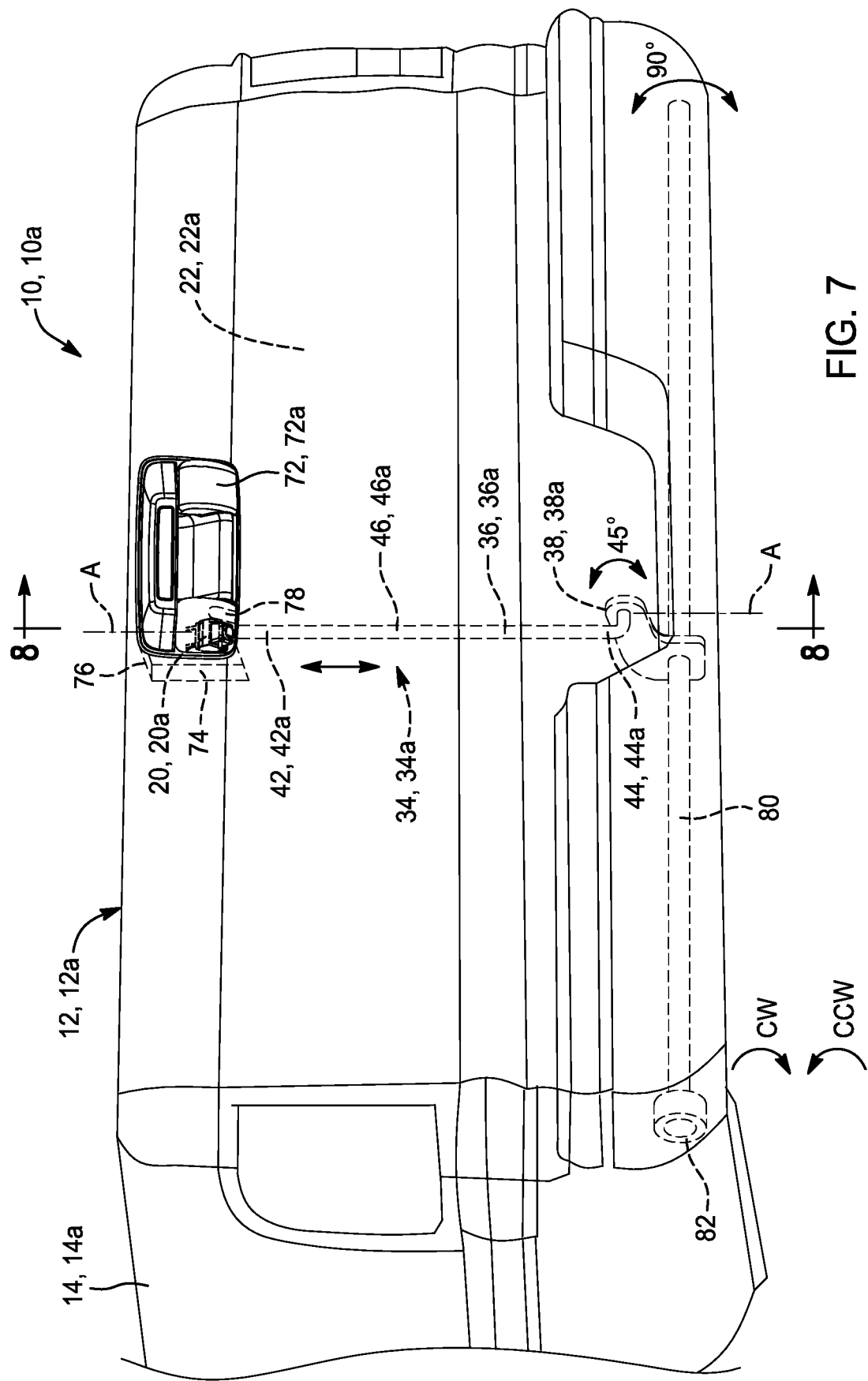
FIG. 7 is the partial rear perspective view of FIG. 6 including a hidden view of the tailgate having a sensor assembly.

With reference to FIG. 7, the sensor assembly 20, 20a is shown as including an actuation mechanism 34, 34a having a first end 42, 42a fixed to a bracket 74. The bracket 74 at least partially encloses the sensor assembly 20, 20a such that the sensor assembly 20, 20a interferes with at least one of a first portion 76 of the bracket 74 (e.g., when the tailgate 12, 12a is opening to the DOWN position) or a second portion 78 of the bracket 74 (when the tailgate 12, 12a is closing to the UP position) when the bracket 74 translates with the main body 46, 46a along an axis A of the main body 46, 46a. The interference between the bracket 74 and the sensor assembly 20, 20a engages a surface of the first portion 76 of the bracket 74 facing the housing 26 and a surface of the housing 26 facing the first portion 76 of the bracket 74 when the bracket 74 translates toward the lower end 18 of the tailgate 12, 12a. When the bracket 74 translates away from the lower end 18, 18a of the tailgate 12, 12a, the interference between the bracket 74 and the sensor assembly 20, 20a engages a surface of the second portion 78 of the bracket 74 facing the housing 26 and a surface of the housing 26 facing the second portion 78 of the bracket 74. For example, FIGS. 8A-8C illustrate that the bracket 74 is a saddle groove (e.g., C-shaped) for the sensor assembly 20, 20a such that the interference with the bracket 74 helps to position the sensor assembly 20, 20a between the first deployed position and the second deployed position. The bracket 74 guides the sensor assembly 20, 20a to change positions without the attachment aperture 32 or a direct connection via the attachment aperture 32 to the actuation mechanism 34, 34a.

Referring further to FIG. 7, the actuation mechanism 34, 34a has a link 36, 36a with a second end 44, 44a rotatably attached to a bell crank 38, 38a. The bell crank 38, 38a is fixedly attached to a torsion spring 80. The torsion spring 80 has at least one anchor point 82 fixed to the tailgate 12, 12a such that when the tailgate 12, 12a rotates about 90 degrees between an UP position and a DOWN position, the torsion spring 80 twists with the tailgate 12, 12a (e.g., rotates about 90 degrees (CW) from the UP position to the DOWN position). The rotation of the torsion spring 80 proportionally rotates the bell crank 38, 38a. For example, if the bell crank 38, 38a is located at a midpoint on the torsion spring 80, the 90 degree (CW) rotation of the torsion spring 80 would rotate the bell crank 38, 38a about 45 degrees (CW). If the torsion spring 80 and the bell crank 38, 38a rotate clockwise, the actuation mechanism 34, 34a translates downward. Likewise, if the torsion spring 80 and the bell crank 38, 38a rotate counterclockwise, the actuation mechanism 34, 34a translates upward.

Additionally or alternatively, the actuation mechanism 34, 34a may be decoupled from the bell crank 38, 38a to manually override the sensor assembly 20, 20a. A user may manually override the sensor assembly 20, 20a in response to a system failure or a system malfunction such as, for example, when the vehicle 10, 10b is damaged. Decoupling the torsion spring 80 from the actuation mechanism 34, 34a at the bell crank 38, 38a prevents a damaged vehicle 10, 10a from further harming the sensor assembly 20, 20a.

FIGS. 8A-8C depict the tailgate 12, 12a transitioning between the UP position (FIG. 8A) and the DOWN position (FIG. 8C). When the tailgate 12, 12a transitions between the UP position and the DOWN position, the sensor assembly 20, 20a moves between the first deployed position (FIG. 8A) and the second deployed position (FIG. 8C). To move between these positions, the sensor assembly 20, 20a includes a toggle spring 84, a first stop 88, and a second stop 90. The toggle spring 84 is attached to a fixed point adjacent the sensor assembly 20, 20a and to a fixed point 86 on the sensor assembly 20, 20a. The toggle spring 84 applies a spring force F on the sensor assembly 20, 20a. The force F applied by the toggle spring 84 transitions the sensor assembly 20, 20a between the first deployed position and the second deployed position. For example, in FIG. 8A the sensor assembly 20, 20a is in the first deployed position with the toggle spring 84 exerting the spring force F on the sensor assembly 20, 20a such that the sensor assembly 20, 20a is tensioned into the first stop 88. Likewise, in FIG. 8C, the sensor assembly 20, 20a is in the second deployed position with the toggle spring 84 exerting the spring force F on the sensor assembly 20, 20a such that the sensor assembly 20, 20a is tensioned into the second stop 90. Thus, the spring force F exerted by the toggle spring 84 drives the sensor assembly 20, 20a to the first deployed position at the first stop 88 and to the second deployed position at the second stop 90.

In FIG. 8C, the tailgate 12, 12a is halfway between the UP position (FIG. 8A) and the DOWN position (FIG. 8C). At the halfway position, the torsion spring 80 has been rotated approximately 45 degrees (CW). The approximately 45 degree rotation by the torsion spring 80 translates the actuation mechanism 34, 34a downward toward the lower end 18, 18a of the tailgate 12, 12a such that the first portion 76 of the bracket 74 engages the sensor assembly 20, 20a and rotates the sensor assembly 20, 20a counterclockwise from the first stop 88 to a position halfway between the first stop 88 and the second stop 90. At the position halfway between the first stop 88 and the second stop 90, the sensor assembly 20, 20a has stretched the toggle spring 84 to a maximum tension. With the toggle spring 84 at the maximum tension, any positional deviation of the sensor assembly 20, 20a in either direction will cause the toggle spring 84 to exert the spring force F on the sensor assembly and shift the sensor assembly 20, 20a to one of the stops (i.e. 88 or 90).

In FIGS. 8A-8C, the first stop 88 and the second stop 90 prevent the sensor assembly 20, 20a from resting directly against the first portion 76 of the bracket 74 or the second portion 78 of the bracket 74 when in the first deployed position (FIG. 8A) or the second deployed position (FIG. 8C). Instead at the first deployed position, the sensor assembly 20, 20a and the first portion 76 of the bracket 74 have a spacing $S_1$. Similarly, at the second deployed position, the sensor assembly 20, 20a and the second portion 78 of the bracket 74 have a spacing $S_2$. The spacing ($S_1$ and $S_2$) permits the sensor assembly 20, 20a to account for tolerances of each component of the sensor assembly 20, 20a without jeopardizing an accuracy of the first deployed position and the second deployed position. The first stop 88 and the second stop 90 permit the sensor assembly 20, 20a to be reliably and repeatedly located at the first and the second deployed position; therefore, the sensor 24 has minimal surveillance deviation in the area surrounding the vehicle 10 that the sensor 24 monitors.

Figure 9:
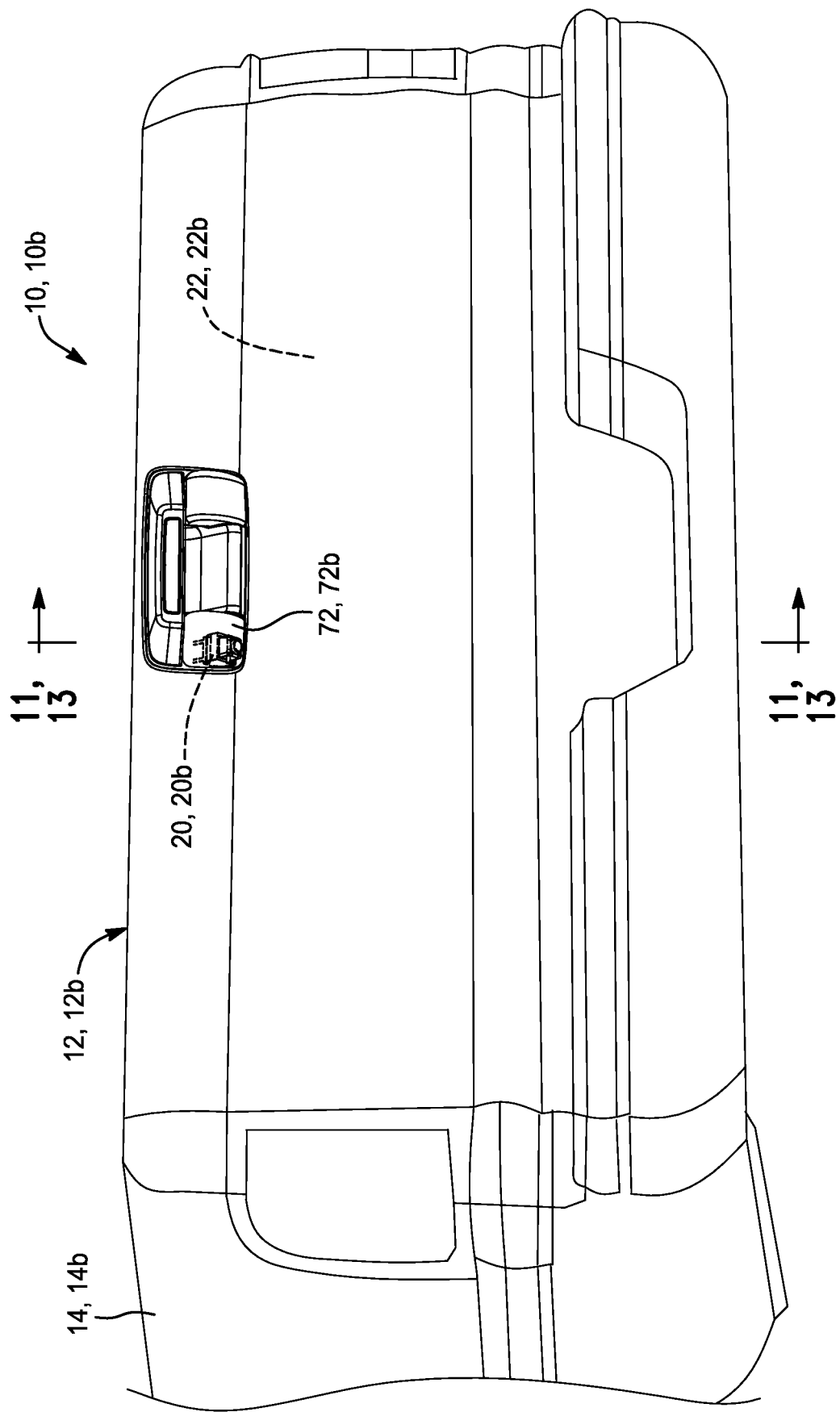
FIG. 9 is a partial rear perspective view of a vehicle including a tailgate having a sensor assembly in accordance with the principals of the present disclosure.

With reference to FIGS. 9-13, another sensor assembly 20, 20b is shown. FIG. 9 represents a tailgate 12, 12b of a vehicle 10, 10b that includes the sensor assembly 20, 20b. The structure and the function of sensor assembly 20, 20b may be substantially similar to that of sensor assembly 20, 20a apart from any exceptions described below and/or shown in Figures. Accordingly description and/or the function of similar features will not be described again in detail. In addition, like reference materials are used herein and in the drawings to identify like features, while like reference numbers containing letter extension (e.g., "b") are used to identify those features that have been modified.

Figure 10:
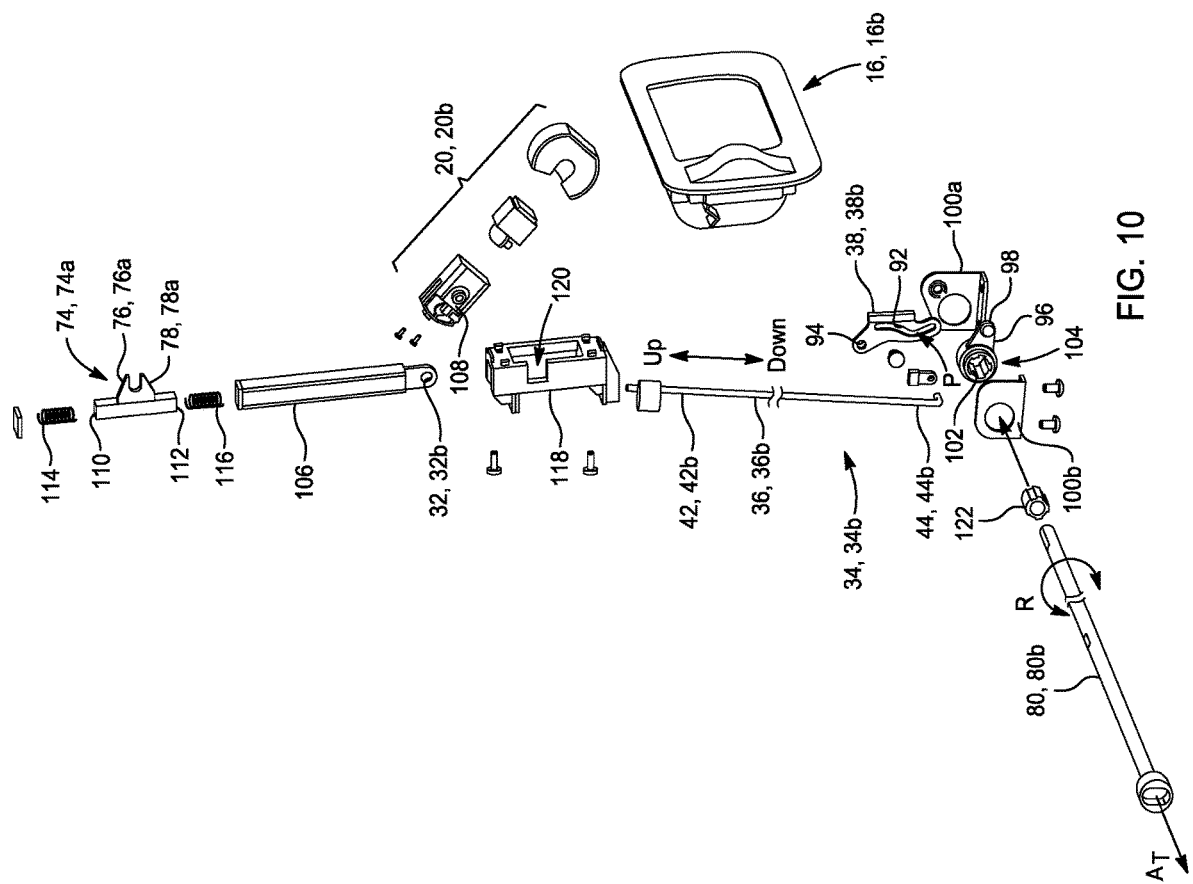
FIG. 10 is a schematic view of an example of a sensor assembly in accordance with the principals of the present disclosure for use with the tailgate of FIG. 9.

FIG. 10 is an example of an exploded view of components related to the sensor assembly 20, 20b. FIG. 10 illustrates an actuation mechanism 34, 34b that includes a link 36, 36b with a first end 42, 42b, a second end 44, 44b, and a main body 46, 46b. The second end 44, 44b of the link 36, 36b is rotatably attached to a bell crank 38, 38b. The bell crank 38, 38b is configured to receive rotational motion from a torsion spring 80, 80b and transfer the rotational motion into linear motion to the actuation mechanism 34, 34b along a length of the actuation mechanism 34, 34b. In some examples, the bell crank 38, 38b includes a motion guide 92, a bell crank attachment aperture 94a, and a bell crank pivot point 94b. The bell crank 38, 38b attaches to the second end 44, 44b of the actuation mechanism 34, 34b at the bell crank attachment aperture 94. The bell crank 38, 38b receives the rotational motion of the torsion spring 80, 80b along the motion guide 92. For example, a torsion arm 96 is connected to the bell crank 38, 38b by a torsion arm fastener 98 such that the torsion arm fastener 98 travels along the motion guide 92 as the torsion spring 80, 80b rotates. Some examples of the motion guide 92 are a rail or a groove formed within the bell crank 38, 38b. The bell crank 38, 38b is pivotably attached to the vehicle 10, 10b such that the bell crank 38, 38b provides linear motion to the actuation mechanism 34, 34b and receives rotational motion from the torsion arm 96 as the tailgate 12, 12b moves between an UP position and a DOWN position. The bell crank 38, 38b may be pivotably attached directly to the lower end 18, 18b of the tailgate 12, 12b or indirectly via an attachment bracket 100a-b.

Referring to FIG. 10, the torsion arm 96 is configured to receive the torsion spring 80, 80b and rotate R relative to the torsion spring 80,80b. For example, an inner surface 102 of the torsion arm 96 has grooves or a plurality of surfaces defining an opening 104 to receive the torsion spring 80, 80b. The grooves or the plurality of surfaces engage the torsion spring 80, 80b as the torsion spring 80, 80b rotates R. The torsion arm 96 attaches to the bell crank 38, 38b at a position P along the motion guide 92. In some examples, the bell crank 38, 38b functions to magnify actuation of the link 36, 36b along the length of the actuation mechanism 34, 34b as the torsion arm 96 moves along the motion guide 92 while the torsion arm 96 rotates between the UP and the DOWN position of the tailgate 12, 12b.

Referring further to FIG. 10, the first end 42, 42b of the actuation mechanism 34, 34b attaches to a slider 106 at attachment aperture 32, 32b. The slider 106 includes a bracket 74, 74a with a first portion 76, 76a and a second portion 78, 78a configured to engage the sensor assembly 20, 20b. In some examples, the bracket 74, 74a is enclosed within at least a portion of the slider 106. As the slider 106 translates with the motion of the actuation mechanism 34, 34b, at least one portion of the first portion 76, 76a or the second portion 78, 78b interferes with an engagement portion 108 of the sensor assembly 20, 20b. In some examples, the engagement portion 108 is a protrusion from the sensor assembly 20, 20b shaped to fit within the bracket 74, 74a. When the bracket 74, 74a engages with the engagement portion, the sensor assembly 20, 20b moves between a first deployed position and a second deployed position. In some examples, to ensure the sensor assembly 20, 20b routinely achieves the first deployed position and the second deployed position, the sensor assembly 20, 20b includes a first stop 88b and a second stop 90b. The slider 106 also includes, adjacent to a first end 110 and a second end 112 of the bracket 74, 74a, a first slider biasing member 114 and a second slider biasing member 116. The biasing members 114 and 116 are multi-purpose such that the biasing members 114 and 116 accommodate for specification variances due to tolerances (e.g., individual tolerances or stacked tolerances of the slider 106, the actuation mechanism 34, 34b, the bell crank 38, 38b, the torsion arm 96, etc.) and/or ensure the sensor assembly 20, 20b is accurately positioned at the first deployed position and the second deployed position. Otherwise, component variance may cause the bracket 74, 74a to misalign with the sensor assembly 20, 20b or fail to repeatedly and to reliably move the sensor assembly 20, 20b between the first deployed position and the second deployed position. In some implementations, the first slider biasing member 114 and the second slider biasing member 116 are coiled springs. The first slider biasing member 114 and the second slider biasing member 116, like the bracket 74, 74a, may also be partially enclosed within the slider 106.

FIG. 10 also illustrates that the slider 106 is configured to slide within a slider crank 118. The slider crank 118 converts motion received by the slider 106 from the actuation mechanism 34, 34b into substantially linear motion. Substantially linear motion, generally, promotes reliability for deployment of the sensor assembly 20, 20b as the tailgate 12, 12b moves between the UP position and the DOWN position. When the tailgate 12, 12b moves between the UP position and the DOWN position, the torsion spring 80,80b may actuate the actuation mechanism 34, 34b in a reciprocating motion that includes both linear motion and some rotational motion about an axis $A_T$ along a length of the torsion spring 80, 80b. To prevent the rotational motion from impacting deployment of the sensor assembly 20, 20b, the slider crank 118 constrains the slider 106 to a slider channel 120 within the slider crank 118. To prevent movement of the slider crank 118, the slider crank 118 may be attached to the actuation handle 16, 16b or to the tailgate 12, 12b.

Additionally or alternatively, the sensor assembly 20, 20b described according to FIG. 10 may be manually overridden. A user may manually override the sensor assembly 20, 20b in response to a system failure or a system malfunction such as damage to the vehicle 10, 10b. In some examples, to override the torsion spring 80, 80b related to the sensor assembly 20, 20b, an end 122 of the torsion spring 80, 80b may be disconnected or repositioned such that the end 122 of the torsion spring 80, 80b does not engage with the torsion arm 96. In some implementations, an extra pin is added to the slider 106 to maintain a position of the sensor assembly 20, 20b (e.g., the first deployed position or the second deployed position). The extra pin may also assist in driving the sensor assembly 20, 20b into the first stop 88b or the second stop 90b.

Figure 11:
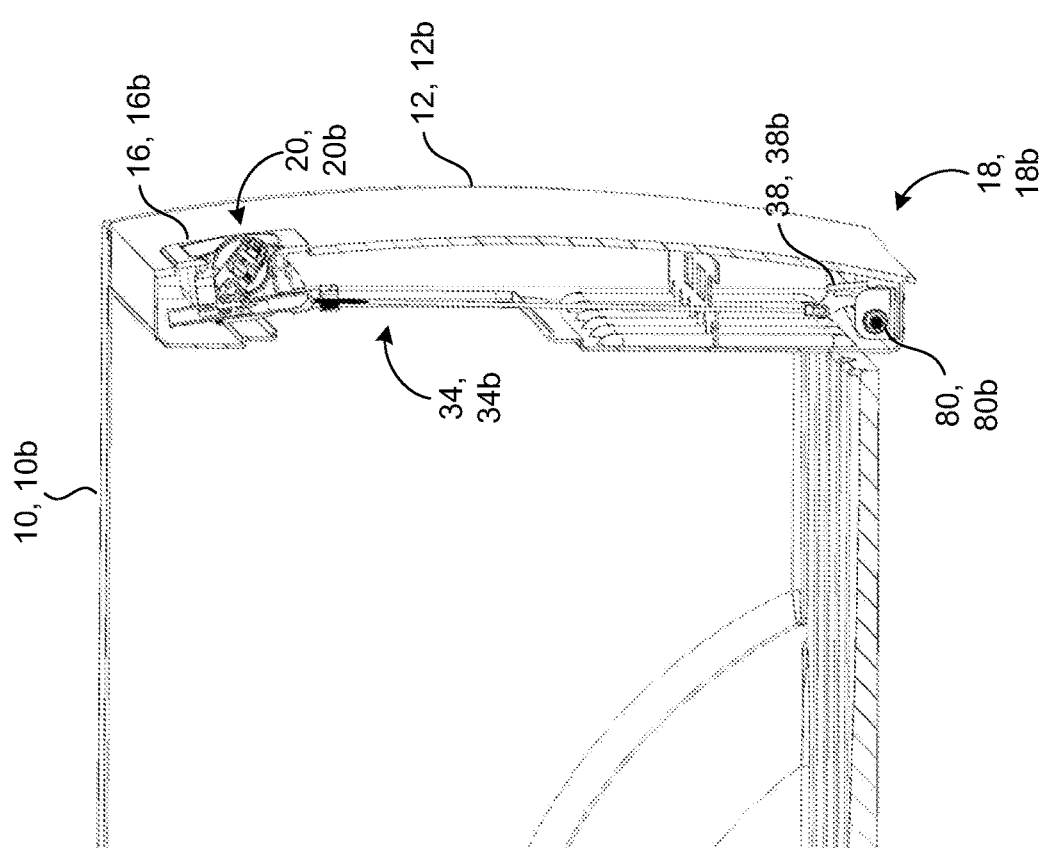
FIG. 11 is a cross-sectional view taken along Line 11-11 of FIG. 9 of the tailgate in an UP position and showing the sensor assembly in a first deployed position.

FIG. 11 illustrates the sensor assembly 20, 20b of FIG. 10 within the tailgate 12, 12b of the vehicle 10, 10b (FIG. 9). FIG. 11 depicts the tailgate 12, 12b in the UP position such that the sensor assembly 20, 20b is in the first deployed position. Referring to FIG. 11, the actuation mechanism 34, 34b, connected to the sensor assembly 20, 20b and to the bell crank 38, 38b, is fastened to the lower end 18, 18b of the tailgate 12, 12b via the bell crank 38, 38b. The bell crank 38, 38b is fastened to the lower end 18, 18b the tailgate 12, 12b such that the torsion spring 80, 80b may rotate the bell crank 38, 38b.

Figure 12:
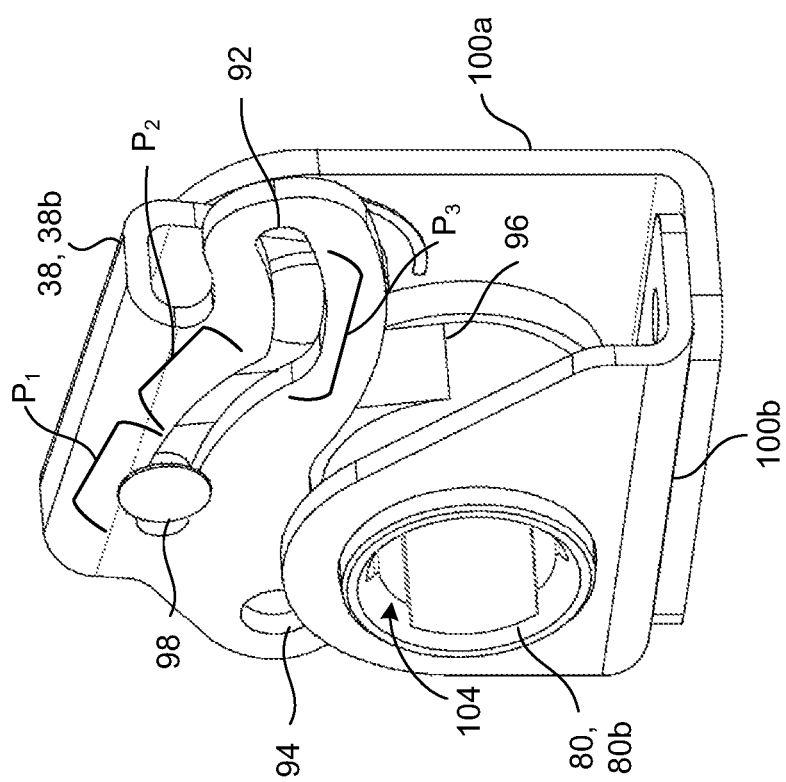
FIG. 12 is a perspective view of an actuation mechanism for use in conjunction with the sensor assembly of FIG. 10.

FIG. 12 is an example of the bell crank 38, 38b in a first position $P_1$. The first position occurs when the tailgate 12, 12b is in the UP position. At the UP position, the torsion arm fastener 98 is located at the first position $P_1$ in motion guide 92 of the bell crank 38, 38b. In some examples, the torsion arm fastener 98 moves between the first position $P_1$, a second position $P_2$, and a third position $P_3$. When the torsion arm fastener 98 is in the second position within the motion guide 92 of the bell crank 38, 38b, the tailgate 12, 12b is in the DOWN position. As the tailgate 12, 12b moves between the UP position and the DOWN position, the torsion arm 96 rotates such that the torsion arm fastener 98 moves between the first position $P_1$ in the motion guide 92 of the bell crank 38, 38b and the second position $P_2$ in the motion guide 92 of the bell crank 38, 38b. The third position $P_3$ within the motion guide 92 corresponds to a safety region where the torsion spring 80, 80b may over rotate the torsion arm 96 (e.g., rotate the torsion arm 96 further than the DOWN position). Without, the safety region of the third position $P_3$ over rotation of the torsion spring 80, 80b relative to the tailgate 12, 12b may occur if the torsion spring 80, 80b becomes unattached from the tailgate 12, 12b. For example, when torsion arm 96 is located at a centerline of the vehicle 10, 10b, the torsion arm 96 rotates about 45 degrees if the torsion spring 80, 80b is coupled to the truck body 14, 14b (e.g., truck bed) at one end and coupled to the tailgate 12, 12b at another end as the tailgate 12, 12b rotates 90 degrees between the UP position and the DOWN position. If the torsion spring 80, 80b fails (e.g., breaks or detaches) at the tailgate 12, 12b, but remains coupled to the truck body 14, 14b (e.g., truck bed), the torsion arm 96 may rotate about 90 degrees (instead of about 45 degrees) due to a lack of torsion from the tailgate 12, 12b. The safety region of the third position $P_3$ functions to prevent excess motion, such as the 90 degree rotation of the torsion arm 96 when the torsion spring 80, 80b fails, and to prevent harm to the sensor assembly 20, 20b.

Figure 13A:
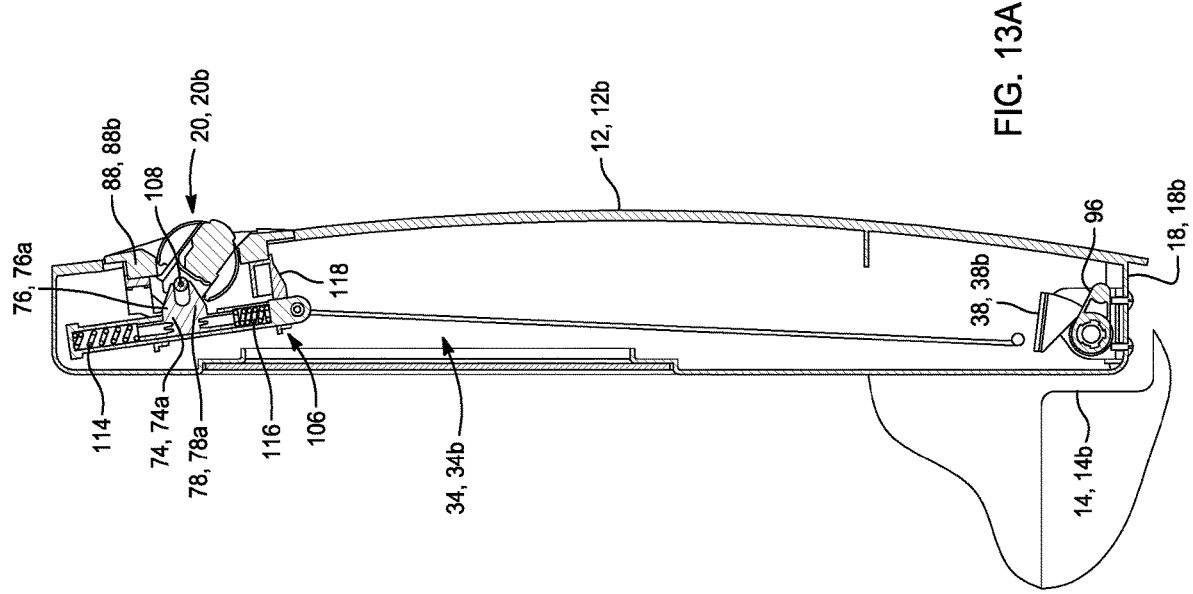
FIG. 13A-13D are cross-sectional views taken along Line 13-13 of FIG. 9 of the tailgate moving between an UP position and a DOWN position.

FIGS. 13A-13D are examples of the sensor assembly 20, 20b when the tailgate 12, 12b moves between the UP position and the DOWN position. FIG. 13A illustrates the tailgate 12, 12b in the UP position. In the UP position, the sensor assembly 20, 20b is in the first deployed position. The second portion 78, 78b of the bracket 74, 74b engages with the engagement portion 108 of the sensor assembly 20, 20b to position the sensor assembly 20, 20b against the first stop 88, 88b such that the sensor assembly 20, 20b is in the first deployed position. When the tailgate 12, 12b is in the UP position, the actuation mechanism 34, 34b has compressed the second slider biasing member 116 while the first slider biasing member 114 is minimally compressed or in a relaxed state. In some implementations, the second slider biasing member 116 is further compressed to permit further travel by the actuation mechanism 34, 34b to accommodate for component variation. In a compressed state, the second slider biasing member 116 may also bias the sensor assembly 20, 20b into the first stop 88, 88b.

Figure 13B:
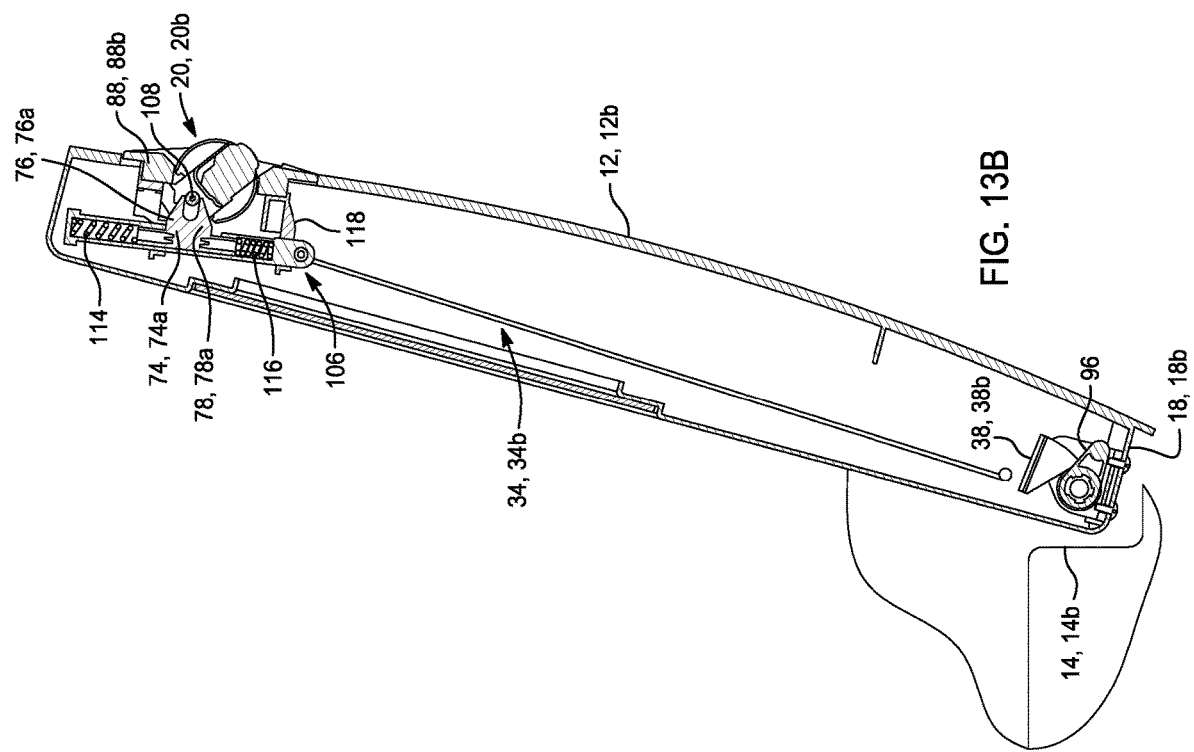

FIG. 13B is an example of the tailgate 12, 12b near or approaching the UP position. When the tailgate 12, 12b is near the UP position, the bracket 74, 74a may have engaged the sensor assembly 20, 20b with the second portion 78, 78a of the bracket 74, 74a at the engagement portion 108 and may have driven the sensor assembly 20, 20b into the first stop 88, 88b. Unlike, FIG. 13A, when the tailgate 12, 12b is in the near UP position, the actuation mechanism 34, 34b may not have finished traveling. If the actuation mechanism 34, 34b has not finished traveling, the second slider biasing member 116 is in a more relaxed state under less compression than when the tailgate 12, 12b is in the UP position (FIG. 13A). Each slider biasing member 114 and 116 permits further actuation of the actuation mechanism 34, 34b even though the sensor assembly 20, 20b may be already in a deployed position against one of the stops 88, 88b or 90, 90b. In some examples, each slider biasing member 114 and 116 permit 20-30% more travel of the actuation mechanism 34, 34b than when compared to nominal specifications of components, such as the actuation mechanism 34, 34b, the slider 106, the bell crank 38, 38b, or the torsion arm 96.

Figure 13C:
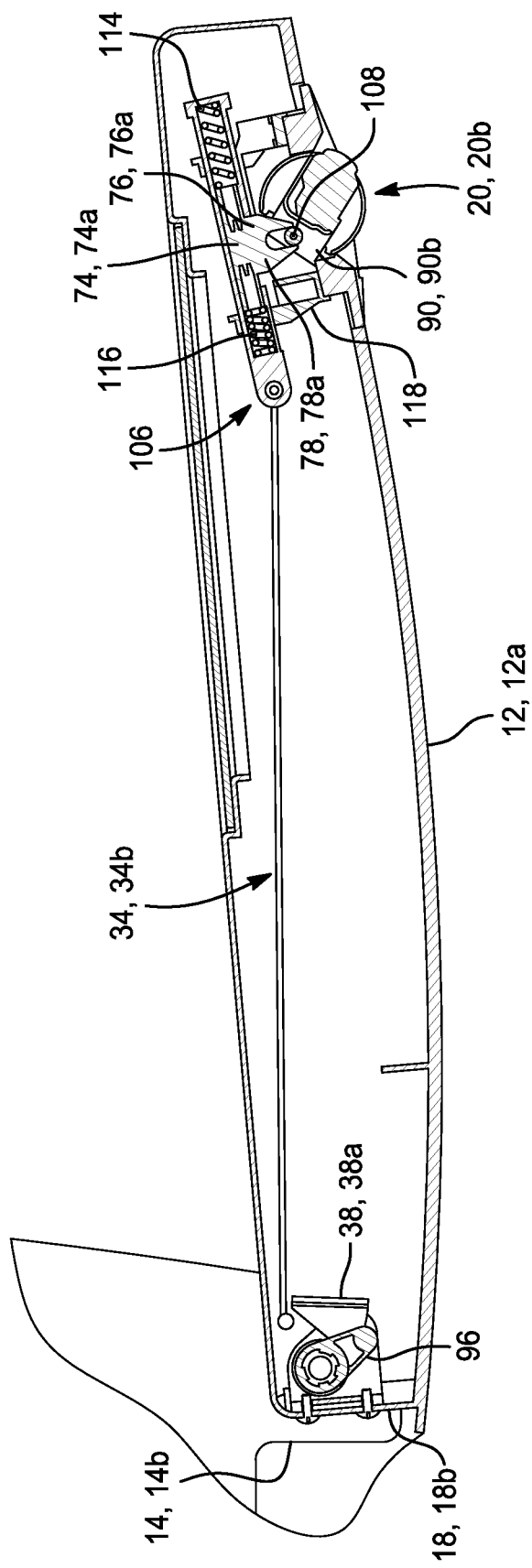
Figure 13D:
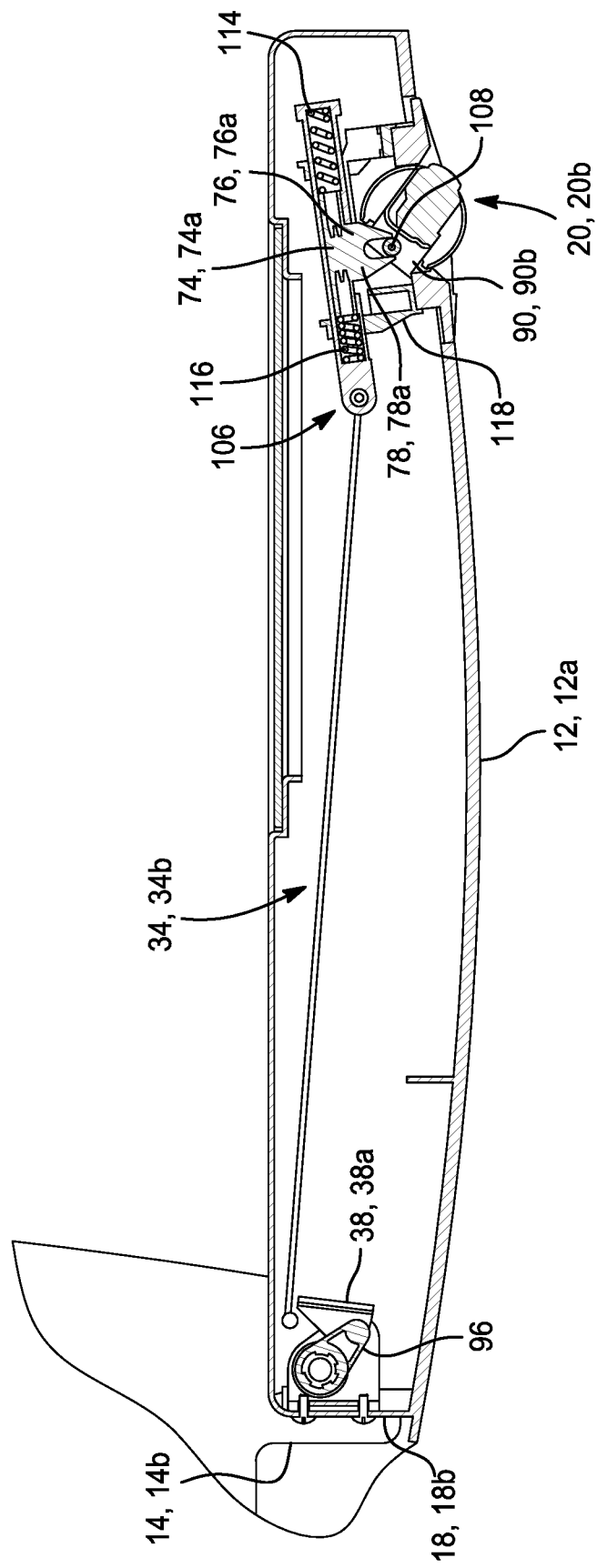

FIG. 13C is an example of the sensor assembly 20, 20b when the tailgate 12, 12b is in a near DOWN position. When in the near DOWN position, the actuation mechanism 34, 34b coupled to the slider 106 has translated toward the lower end 18, 18b of the tailgate 12, 12b. During the translation, the first portion 76, 76a of the bracket 74, 74a engages with the engagement portion 108 of the sensor assembly 20, 20b and directs the sensor assembly 20, 20b to the second stop 90, 90b. In the near DOWN position (similar to FIG. 13B) the actuation mechanism 34, 34b coupled to the slider 106 may not have finished traveling. If the actuation mechanism 34, 34b has not finished traveling, the first slider biasing member 114 is in a more relaxed state under less compression than when the tailgate 12, 12b is in the DOWN position (FIG. 13D). Each slider biasing member 114 and 116 permits further actuation of the actuation mechanism 34, 34b even though the sensor assembly 20, 20b may be already in a deployed position against the second stop 90, 90b, as FIG. 13C depicts.

FIG. 13D is an example of the sensor assembly 20, 20b when the tailgate 12, 12b is in the DOWN position. When in the DOWN position, the actuation mechanism 34, 34b coupled to the slider 106 has translated toward the lower end 18, 18b of the tailgate 12, 12b. During the translation, the first portion 76, 76a of the bracket 74, 74a engages with the engagement portion 108 of the sensor assembly 20, 20b and directs the sensor assembly 20, 20b to the second stop 90, 90b such that the sensor assembly 20, 20b is in the second deployed position. When the tailgate 12, 12b is in the DOWN position, the actuation mechanism 34, 34b has compressed the first slider biasing member 114 while the second slider biasing member 116 is minimally compressed or in a relaxed state. In some implementations, the first slider biasing member 114 is further compressed to permit further travel by the actuation mechanism 34, 34b to accommodate for component variation. In a compressed state, the first slider biasing member 114 may also bias the sensor assembly 20, 20b into the second stop 90, 90b.

Additionally or alternatively, mechanical energy provided by the torsion spring 80, 80b to move the sensor assembly 20, 20a-b between the first deployed position and the second deployed position may be provided by chains and/or cables connected between the body 14, 14a-b of the vehicle 10, 10a-b and the tailgate 12, 12a-b. Generally, chains and/or cables constrain the tailgate 12, 12a-b of the vehicle 10, 10a-b to about 90 degrees of rotation such that the tailgate 12, 12a-b may move between the UP position and the DOWN position. A sensor assemblies 20 (e.g., 20a-b) may utilize motion and/or force (e.g., tension) of the chains and/or cables to deploy the sensor assembly 20, 20a-b between the first deployed position and the second deployed position. For example, the cables and/or chains may attach to a torsion arm 96 or a bell crank 38 (e.g., 38a-b) to move the actuation mechanism 34 and therefore the sensor assembly 20.

Figure 14:
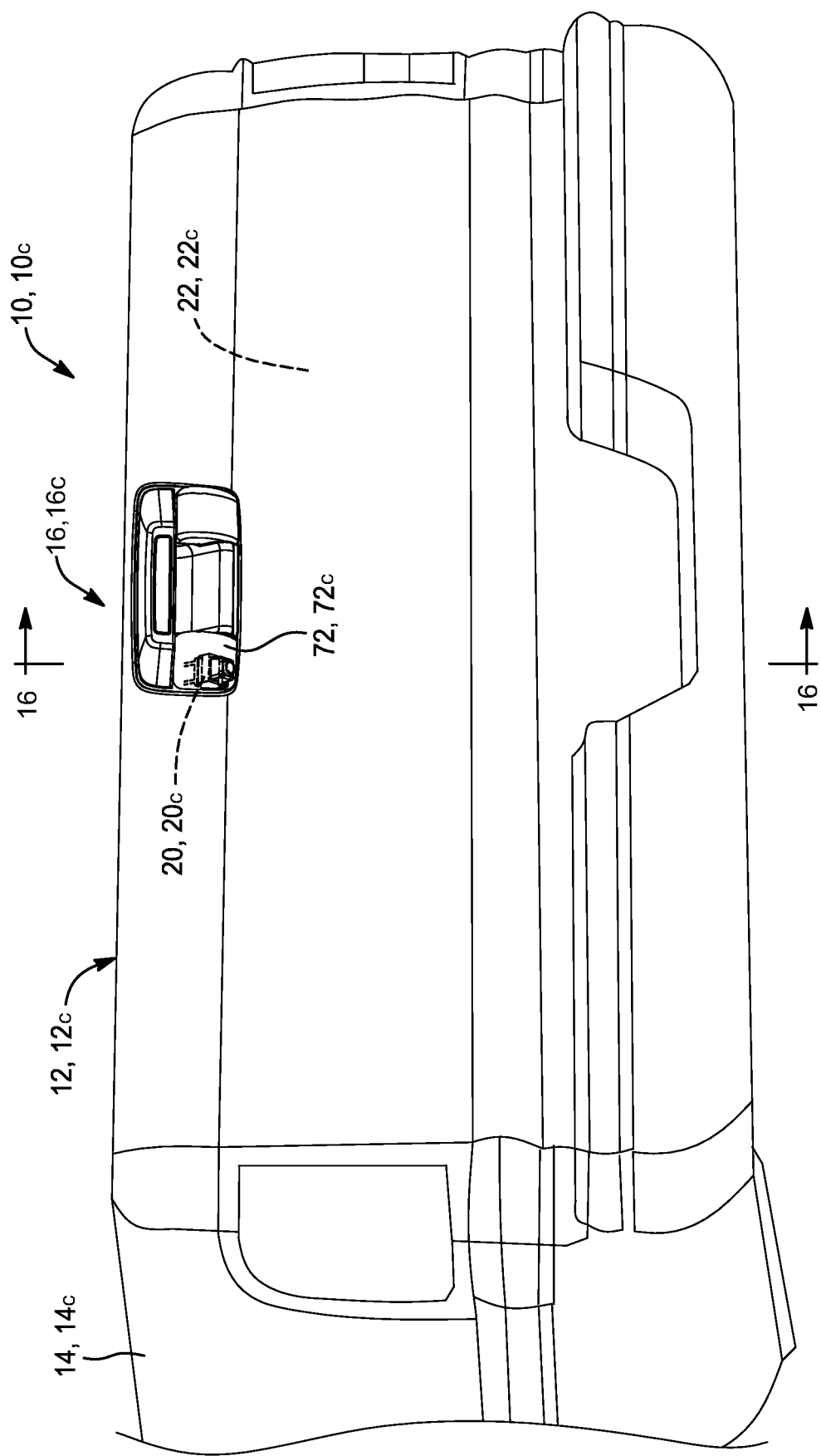
FIG. 14 is a partial rear perspective view of a vehicle including a tailgate having a sensor assembly in accordance with the principals of the present disclosure.
Figure 15:
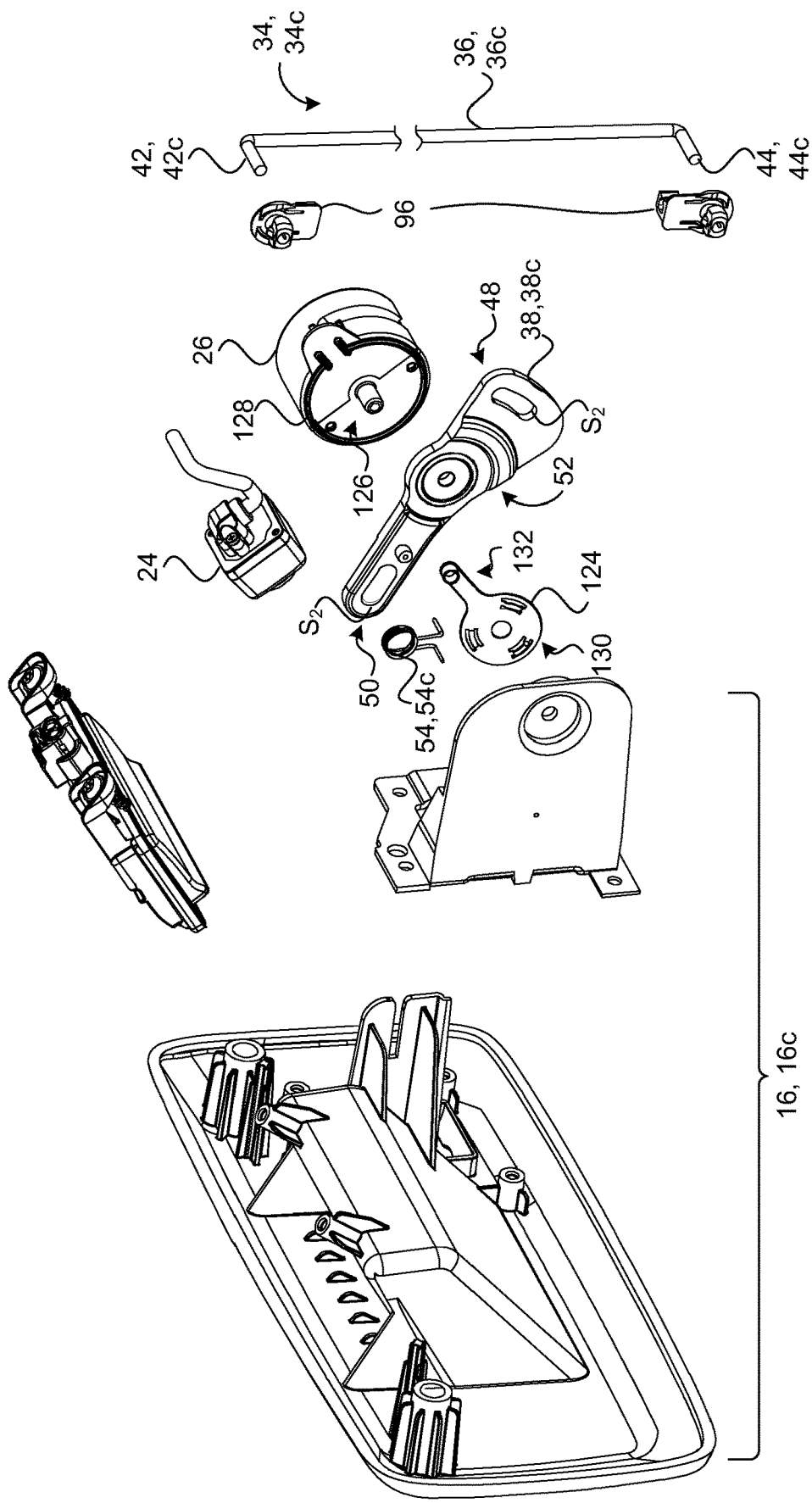
FIG. 15 is a schematic view of an example of a sensor assembly in accordance with the principals of the present disclosure for use with the tailgate of FIG. 14.

With reference to FIGS. 14-16, another sensor assembly 20, 20c is shown. FIG. 14 represents a tailgate 12, 12c of a vehicle 10, 10c that includes the sensor assembly 20, 20c. The structure and the function of sensor assembly 20, 20c may be substantially similar to that of sensor assembly 20, 20a-b apart from any exceptions described below and/or shown in Figures. Accordingly description and/or the function of similar features will not be described again in detail. In addition, like reference materials are used herein and in the drawings to identify like features, while like reference numbers containing letter extension (e.g., "c") are used to identify those features that have been modified.

FIG. 15 is an example of an exploded view of components related to the sensor assembly 20, 20c. FIG. 15 illustrates an energy transfer mechanism, such as an actuation mechanism 34, 34c, that includes a link 36, 36c with a first end 42, 42c, a second end 44, 44c, and a main body 46, 46c. Here, unlike FIG. 10, a bell crank 38, 38c is rotatably attached to the first end 42, 42c of the link 36, 36c rather than the second end 44 as illustrated in FIGS. 9-13. Like the bell cranks 38, 38a-b previously described, the bell crank 38, 38c is configured to receive rotational motion from an energy storage device, such as the torsion spring 80 (not shown). In this example, the bell crank 38, 38c receives rotational motion from the torsion spring 80 via linear motion of the actuation mechanism 34, 34c along a length of the actuation mechanism 34, 34c. Similar to prior sensor assemblies (e.g., sensor assembly 20, 20b), a torsion arm 96 or linkage may receive the rotational motion from the torsion spring 80 and convert this rotational energy into translational energy of the actuation mechanism 34, 34c along a length of the tailgate 12, 12c. For example, the actuation mechanism 34, 34c moves in a reciprocating-like motion as the tailgate 12, 12c moves between an open position and a closed position.

The bell crank 38, 38c is pivotably attached to the vehicle 10, 10c such that the bell crank 38, 38c provides rotational motion to the sensor 24 and/or the sensor housing 26 based on translational motion received from the actuation mechanism 34, 34c. In some implementations, such as FIG. 15, a fulcrum 52, 52c of the bell crank 38, 38c includes an attachment point that secures the bell crank 38, 38c to an actuation handle 16, 16c or to a position within the tailgate 12, 12c adjacent the actuation handle 16, 16c. In other words, the bell crank 38, 38c may be pivotably attached directly to an upper end of the tailgate 12, 12c at the actuation handle 16, 16c or indirectly attached (e.g., via an attachment bracket). The bell crank 38, 38c may include a curved slot $S_1$ at a first leg 48, 48c to receive the first end 42, 42c of the link 36, 36c. The slot is configured to account for motion of the actuation mechanism 34, 34c as the sensor assembly 20, 20c moves between the first deployed position as the tailgate 12, 12c is in the UP position and the second deployed position as the tailgate 12, 12c is in the DOWN position.

Referring to FIG. 15, the sensor assembly 20, 20c may also include a clutch plate 124 to aid in manual override of the actuation mechanism 34, 34c. Here, manual override may decouple from the bell crank 38, 38c at the clutch plate 124 disposed on the sensor housing 26 to avoid damage to the sensor assembly 20, 20c. In this example, the clutch plate 124 is linked to the bell crank 38, 38c at a second leg 50, 50c of the bell crank 38, 38c.

Figure 16A:
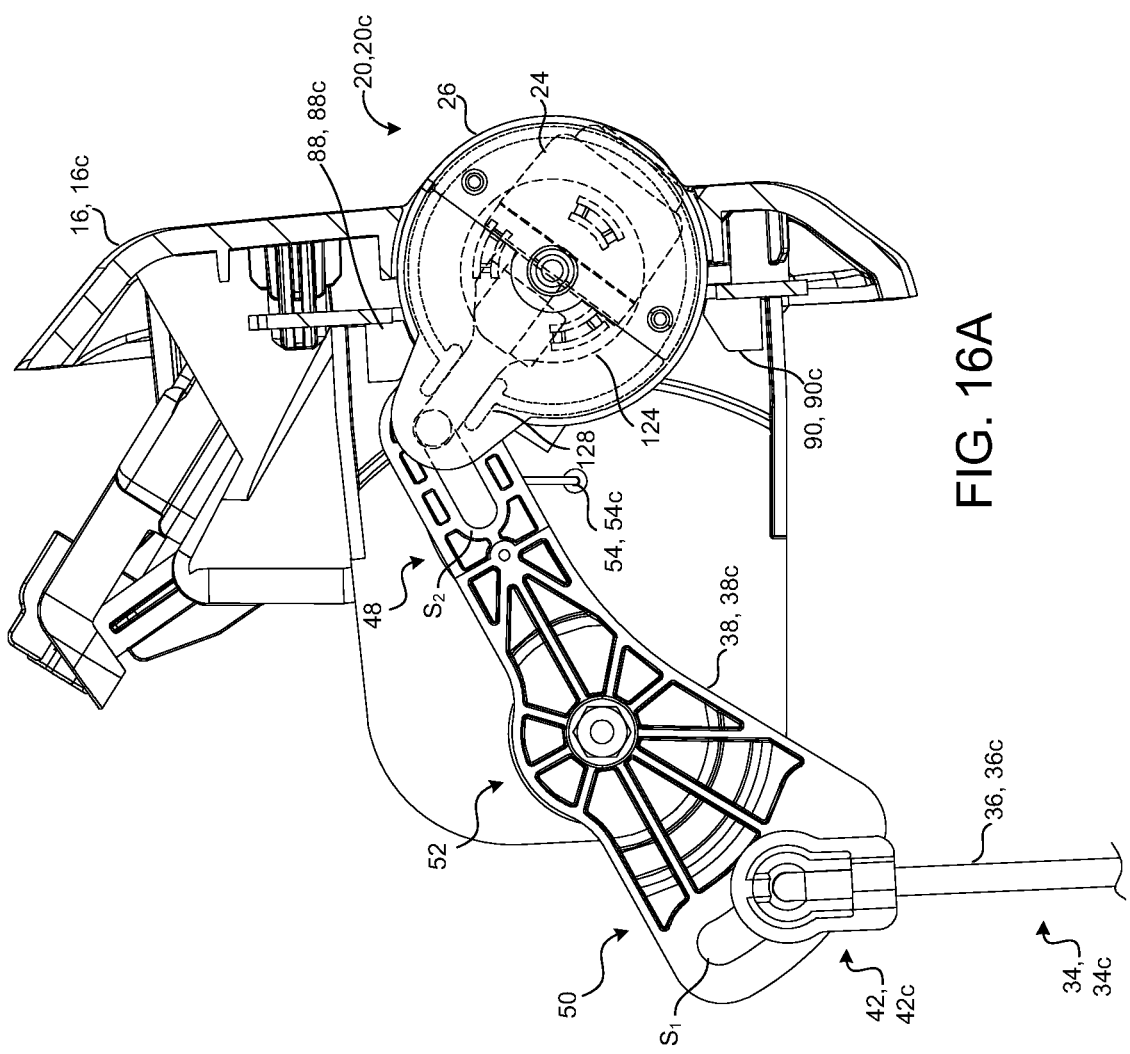
FIG. 16A is cross-sectional view taken along Line 16-16 of FIG. 14 of the tailgate in an UP position and showing the sensor assembly in a first deployed position.
Figure 16B:
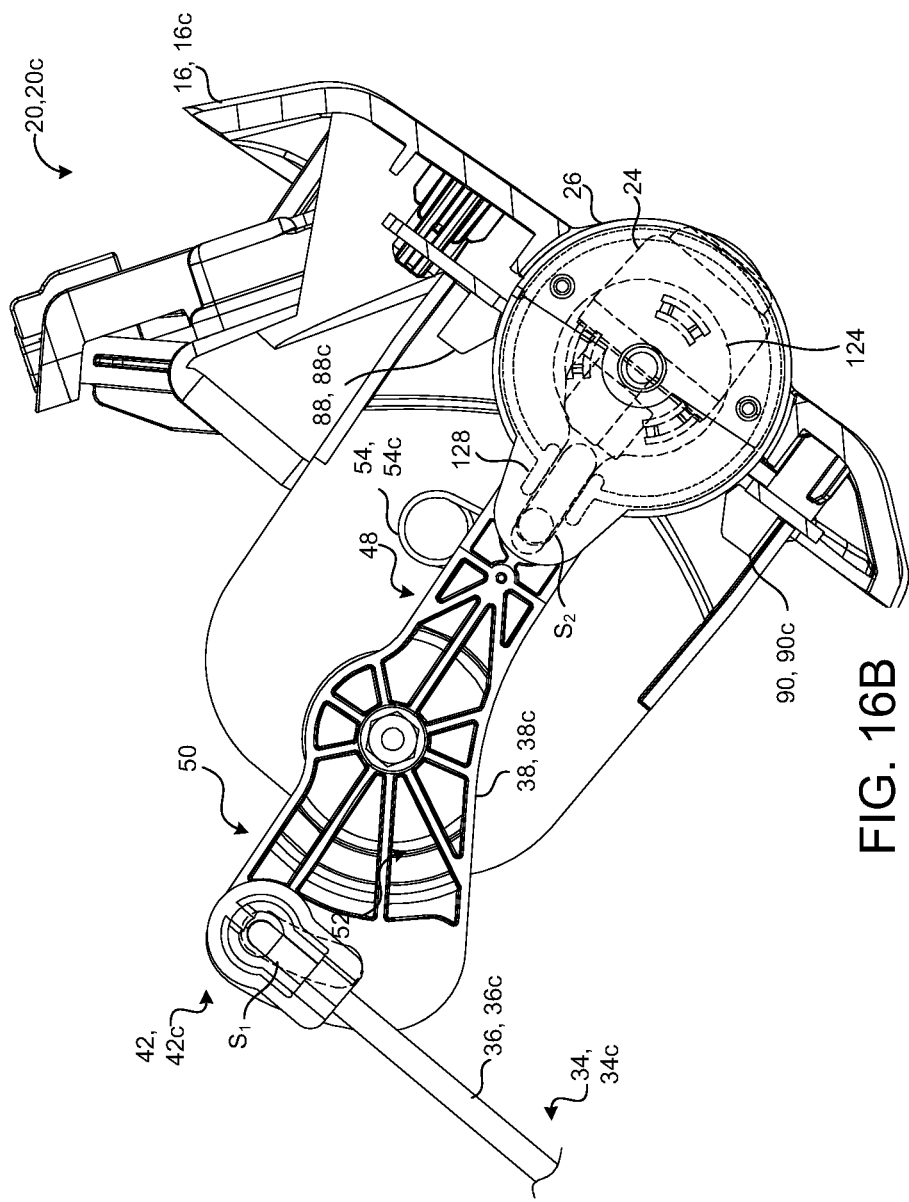
FIG. 16B is a cross-sectional view of the tailgate taken along Line 16-16 of FIG. 14 showing the tailgate halfway between the UP position and a DOWN position.

As shown in FIGS. 16A-C, the link between the bell crank 38, 38c and the clutch plate 124 may be a direct coupling. At the second leg 50, 50c of the bell crank 38, 38c, the bell crank 38, 38c may have another slot $S_2$ to account for desired deployed positions of the sensor 24 as well as movement of the bell crank 38, 38c with respect to the actuation mechanism 34, 34c. The clutch plate 124 may be shaped such that, at the second leg 50, 50c, the clutch plate 124 curves away from bell crank 38, 38c and the sensor housing 26. In some implementations, the curvature of the clutch plate 124 allows the clutch plate 124 generally to sit within a recessed groove 126 of the sensor housing 26 during operation until the clutch plate 124 experiences an abnormally large force.

Though the clutch plate 124 generally sits within the recessed groove 126 with side walls 128, this design permits the curvature of the clutch plate 124 to ride up over the side walls 128 and out of the recessed groove 126 when the clutch plate 124 receives a large force that may damage the sensor 24. When the clutch plate 124 rides over the side walls 128 and out of the recessed groove 126, the curvature of the clutch plate 124 provides a frictional force against the sensor housing 26 at an end 130 of the clutch plate 124 opposite an end 132 attached to the second leg 50, 50c of the bell crank 38, 38c. For example, the clutch plate 124 receives an abnormally large force, rides up over the side walls 128 of the recessed groove 126, disconnects from the second leg 50, 50c of the bell crank 38, 38c as the clutch plate 124 rides up over the side walls 128 of the recessed groove 126, and provides a friction force against the sensor housing 26 such that someone may manually adjust the position of the sensor 24 at the tailgate 12, 12c.

Here, when someone manually adjusts the position of the sensor 24 at the tailgate 12, 12c with the sensor 24 decoupled from the bell crank 38, 38c and the actuation mechanism 34, 34c, the frictional force from the clutch plate 124 at the end 130 holds the sensor 24 in the manually set position. If large forces generated at the torsion spring 80 are not reduced in the sensor assembly 20 during operation (e.g., through the actuation mechanism 34 and related connections) the design may inherently safeguard the sensor 24 and still permit an operator of the sensor assembly 20 to manually adjust the sensor 24 as desired to maintain a field of view behind the vehicle 10, 10c. Although a clutch plate 124 is shown with respect to FIGS. 14-16, the clutch plate 124 may be one type of manual override method that also may be incorporated in other designs of the sensor assembly 20.

FIGS. 16A-C are provided as examples to illustrate the sensor assembly 20, 20c moving between the first deployed position (FIG. 16A) to the second deployed position (FIG. 16C). Referring to FIG. 16A, FIG. 16A illustrates the sensor 24 in the first deployed position as the tailgate 12, 12c is up in the closed position. The tailgate 12, 12c may begin in this closed position are return to this closed position from the open position.

When the tailgate 12, 12c returns from the open position, the sensor 24 moves from the second deployed position (FIG. 16C) to the first deployed position (FIG. 16A). Similar to previously described sensor assemblies 20, 20a-b, the movement of the tailgate 12, 12c creates a moment (CCW) about the torsion spring 80 that translates the link 36, 36c of the actuation mechanism 34, 34c upwards towards the actuation handle 16, 16c. The translational movement of the link 36, 36c, may slide an attachment point of the link 36, 36c and the bell crank 38, 38c at the first end 42, 42c to a position in the slot $S_1$ of the bell crank 38, 38c.

In this example, the position is at an end of the slot $S_1$ is such that interference between the first end 42, 42c of the link 36, 36c and the bell crank 38, 38c in the slot $S_1$ causes the bell crank 38, 38c to pivotably rotate about the fulcrum 52 counter clockwise like the torsion spring 80. The rotation of the bell crank 38, 38c rotates the second leg 50 of the bell crank 38, 38c causing an attachment point between the sensor housing 26 and the bell crank 38, 38c to move within the slot $S_2$ until interference between an end of the slot $S_2$ drives the sensor 24 within the sensor housing 26 into the first deployed position at stop 88, 88c. In FIGS. 16A-C, the first stop 88, 88c and the second stop 88, 88c are molded into the actuation handle 16, 16c.

Although, the sensor assembly 20, 20c is generally shown in FIGS. 16A-C accompanying the actuation handle 16, 16c, the sensor assembly 20, 20c may be mounted anywhere along the tailgate 12, 12c. Additionally or alternatively, a biasing member 54, 54c may attach to the bell crank 38, 38c to apply a biasing force on the bell crank 38, 38c as the bell crank 38, 38c pivotably rotates about the fulcrum 52. For example, in FIGS. 16A-C, the biasing member 54, 54c is a toggle spring attached to a position within the actuation handle 16, 16c or bracket secured to the actuation handle 16, 16c and to the bell crank 38, 38c. The biasing member 54, 54c may help ensure that the sensor 24 and sensor housing 26 is reliably and repeatably driven into each of the stops 88, 88c and 90, 90c.

FIG. 16B is an example of the sensor assembly 20, 20c in a position between the first deployed position and the second deployed position (e.g., similar to FIG. 8B or 13B). The sensor assembly 20, 20c may be in a position between the first deployed position and the second deployed position when either the tailgate 12, 12c is closing or opening. Whether the tailgate 12, 12c is closing or opening will change the direction of the moment (CCW or CW) provided by the torsion spring 80.

When the tailgate 12, 12c is opening the moment provided by the torsion spring 80 is clock-wise (as shown in FIG. 7) and causes the actuation mechanism 34, 34c at the first end 42, 42c to interfere with an end of the slot $S_1$ as shown in FIG. 16B. The interference provides a force to rotate the bell crank 38, 38c about the fulcrum 52 to move the sensor 24 and sensor housing 26 toward the second deployed position in FIG. 16C.

At a position, such as FIG. 16B, between the first deployed position and the second deployed position, the biasing member 54, 54c may apply minimal force to the bell crank 38, 38c (similar to FIG. 8B). As the tailgate 12, 12c continues to open, the bell crank 38, 38c continues to rotate about the fulcrum 52 increasing the force applied by the biasing member 54, 54c to bias the sensor 24 toward the stop 90, 90c at the second deployed position.

During rotation of the bell crank 38, 38c, an attachment portion of the sensor 24 and/or sensor housing 26 to the bell crank 38, 38c may slide or move along the slot $S_2$ until the sensor assembly 20, 20c is in the second deployed position against the stop 90, 90c. In some examples, such as FIGS. 16A-C, the attachment portion of the sensor 24 and/or sensor housing 26 is the end 132 of the clutch plate 124.

In configurations with the clutch plate 124, the side walls 128 of the recessed groove 126 permit the bell crank 38, 38c to rotate the sensor housing 26. The closing of the tailgate 12, 12c to the UP position functions opposite the opening of the tailgate 12, 12c such that a counterclockwise moment of the torsion spring 80 rotates the bell crank 38, 38c also counterclockwise to rotate the sensor housing 26 to the first deployed position. Here, the actuation mechanism 34, 34c translates towards the lower end 18 of the tailgate 12, 12c. This translation causes an attachment portion at first end 42, 42c to interfere with an end of the slot $S_1$ to provide counterclockwise rotation to the bell crank 38, 38c.

Although various sensor assemblies 20, 20a-c may be effective in different applications based on design needs and types of vehicles, the sensor assembly 20, 20c may avoid many tolerance issues that may affect the repeatability of the field of view of the sensor 24 from assembly to assembly and traveling between deployment positions. For example, component tolerances may stack up over the sensor assembly 20 making one sensor assembly 20 differ from another sensor assembly 20 of the same sensor assembly model.

With regard to a sensor assembly, such as sensor assembly 20, 20c, by molding the stops 88c and 90c into an internal side of the actuation handle 16, 16c, the sensor assembly 20, 20c achieves repeatable and reliable accuracy for the first deployed position and the second deployed position of the sensor 24. For example, with molding the stops 88c and 90c into the internal side (side facing into the cavity 22 of the tailgate 12) of the actuation handle 16, 16c, the design variance of sensor assembly 20, 20c is predominantly dependent on an accuracy of the molding process for the stops 88c and 90c. In other words, design variance potentially can be controlled by a single molding tool rather than coordinated across multiple tools for components.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. An assembly for a vehicle having a closure panel, the assembly comprising:
   a sensor;
   a housing supporting the sensor within the closure panel between a first deployed position and a second deployed position, the sensor operable to sense an area proximate to the closure panel in the first deployed position and in the second deployed position;
   a link rotatably attached to the housing;
   a plunger coupled to the link and operable to engage a surface of the vehicle to move the housing between the first deployed position and the second deployed position via the link; and
   a manual override configured to disconnect the link from the housing while allowing the sensor to hold a manually-set position.

2. The assembly of claim 1, wherein the plunger moves the housing between the first deployed position and the second deployed position based on a position of the closure panel relative to the vehicle.

3. The assembly of claim 1, wherein the closure panel is movable relative to the vehicle between a closed position and an open position, the plunger operable to move the housing into one of the first deployed position and the second deployed position when the closure panel is in one of the closed position and the open position and operable to move the housing into the other of the first deployed position and the second deployed position when the closure panel is in the other of the closed position and the open position.

4. The assembly of claim 3, wherein the sensor is operable to sense approximately the same field-of-view in the area proximate to the closure panel when the sensor is in the first deployed position and when the sensor is in the second deployed position.

5. The assembly of claim 3, wherein the closure panel is rotated approximately ninety degrees (90°) relative to the vehicle when rotated between the closed position and the open position.

6. The assembly of claim 5, wherein the sensor is rotated approximately ninety degrees (90°) relative to the closure panel when the sensor is rotated between the first deployed position and the second deployed position.

7. The assembly of claim 3, wherein the sensor is at approximately the same angle relative to the vehicle when the closure panel is in the closed position and when the closure panel is in the open position.

8. The assembly of claim 1, wherein the link is one of a rod and a cable.

9. The assembly of claim 1, wherein the link is biased in a direction away from the sensor.

10. The assembly of claim 9, further comprising a biasing member operable to exert a force on the link to bias the link in the direction away from the sensor.

11. The assembly of claim 1, further comprising an element disposed between and connecting the plunger and the link.

12. The assembly of claim 11, wherein the element is a bell crank having a first arm in engagement with the plunger and a second arm in engagement with the link.

13. The assembly of claim 12, wherein the bell crank is rotatably supported within the closure panel.

14. The assembly of claim 13, further comprising a biasing member operable to bias the bell crank in a first rotational direction.

15. The assembly of claim 1, wherein the sensor is one of a proximity sensor and a camera.

16. The assembly of claim 1, wherein the sensor is at approximately the same angle relative to the vehicle when the sensor is in the first deployed position and when the sensor is in the second deployed position.

* * * * *